(12) United States Patent
Marcotte et al.

(10) Patent No.: US 9,057,543 B2
(45) Date of Patent: Jun. 16, 2015

(54) SOLAR COLLECTOR MODULE

(71) Applicant: Abengoa Solar Inc., Lakewood, CO (US)

(72) Inventors: Patrick Marcotte, Lakewood, CO (US); Kenneth Biggio, Lakewood, CO (US); Edmund Kenneth May, Lakewood, CO (US); Kerry Manning, Lakewood, CO (US); Rachel Backes, Lakewood, CO (US); Janina Nettlau, Lakewood, CO (US); Rick Sommers, Lakewood, CO (US)

(73) Assignee: Abengoa Solar LLC, Lakewood, CO (US)

( * ) Notice: Subject to any disclaimer, the term of this patent is extended or adjusted under 35 U.S.C. 154(b) by 0 days.

(21) Appl. No.: 14/144,182

(22) Filed: Dec. 30, 2013

(65) Prior Publication Data

US 2014/0182580 A1    Jul. 3, 2014

Related U.S. Application Data

(62) Division of application No. 13/386,874, filed as application No. PCT/US2010/043118 on Jul. 23, 2010, now Pat. No. 8,615,960.

(60) Provisional application No. 61/228,480, filed on Jul. 24, 2009.

(51) Int. Cl.
*E04H 12/00* (2006.01)
*F24J 2/52* (2006.01)
(Continued)

(52) U.S. Cl.
CPC ............ *F24J 2/5233* (2013.01); *Y10T 403/443* (2015.01); *Y02E 10/45* (2013.01);
(Continued)

(58) Field of Classification Search
USPC .......... 52/633, 173.3, 638, 648.1, 643, 653.1, 52/653.2, 655.1, 80.1, 81.1, 652.1, 654.1; 403/169, 170, 176, 171, 181
See application file for complete search history.

(56) References Cited

U.S. PATENT DOCUMENTS 3,635,425 A    1/1972 Swet
3,851,601 A    12/1974 Davis
(Continued)

FOREIGN PATENT DOCUMENTS

EP    1 903 155 A1    3/2008
ES    2 294 903 A1    4/2008
(Continued)

OTHER PUBLICATIONS

Hanaor, Ariel, Special Issue on "Prefabricated Spatial Frame Systems", International Journal of Space Structures, vol. 10 No. 3, 1995, 50 Pages, Multi-Science Publishing Co., Ltd., Essex, England.
(Continued)

*Primary Examiner* — Elizabeth A Plummer
*Assistant Examiner* — Kyle Walraed-Sullivan
(74) *Attorney, Agent, or Firm* — Kilpatrick Townsend & Stockton LLP

(57) ABSTRACT

Improvements in the design and construction of solar collector modules. Aspects of the invention include improvements in the layout of a frame for a solar collector module, and in the joining of structural members of the frame at nodes. In one example, a module of a solar collector includes a reflector and a three-dimensional structural frame that supports the reflector. The frame is made up of substantially rigid elongate frame members interconnected at nodes. Improved node connection components include hubs or frame members having tabs for receiving frame member connections. A tab may have a width that is substantial in relation to its height. The frame may incorporate asymmetry in its layout, in the size or presence of frame members, or in the positioning of the nodes.

17 Claims, 16 Drawing Sheets

(51) Int. Cl.
*F24J 2/14* (2006.01)
*F24J 2/54* (2006.01)
*E21B 15/00* (2006.01)
*E04B 1/19* (2006.01)

(52) U.S. Cl.
CPC . *Y02E 10/47* (2013.01); *F24J 2/14* (2013.01); *F24J 2/526* (2013.01); *F24J 2/541* (2013.01); *E04B 2001/1927* (2013.01); *E21B 15/00* (2013.01)

(56) References Cited

U.S. PATENT DOCUMENTS

| | | | |
|---|---|---|---|
| 3,948,012 A * | 4/1976 | Papayoti | 52/263 |
| 3,977,800 A | 8/1976 | Cassel | |
| 4,005,629 A | 2/1977 | Franklin | |
| 4,021,267 A | 5/1977 | Dettling | |
| 4,122,646 A | 10/1978 | Sapp | |
| 4,198,953 A | 4/1980 | Power | |
| 4,211,044 A | 7/1980 | Gugliotta et al. | |
| 4,249,514 A * | 2/1981 | Jones | 126/605 |
| 4,269,173 A | 5/1981 | Krueger et al. | |
| 4,326,773 A | 4/1982 | Colas | |
| 4,379,649 A | 4/1983 | Phillips et al. | |
| 4,386,600 A | 6/1983 | Eggert, Jr. | |
| 4,422,614 A | 12/1983 | Santos | |
| 4,432,661 A | 2/1984 | Phillips et al. | |
| 4,449,843 A | 5/1984 | Wendel | |
| 4,460,288 A | 7/1984 | Schaff | |
| 4,508,426 A | 4/1985 | Hutchison | |
| 4,558,551 A | 12/1985 | Sevelinge et al. | |
| 4,687,880 A | 8/1987 | Morris | |
| 4,745,412 A | 5/1988 | Creaser et al. | |
| 4,745,725 A * | 5/1988 | Onoda | 52/646 |
| 4,803,819 A | 2/1989 | Kelsey | |
| 4,829,739 A | 5/1989 | Coppa | |
| 4,904,108 A | 2/1990 | Wendel | |
| 4,988,230 A | 1/1991 | Banthia et al. | |
| 5,058,565 A * | 10/1991 | Gee et al. | 126/570 |
| 5,104,211 A * | 4/1992 | Schumacher et al. | 359/853 |
| 5,224,320 A | 7/1993 | Mai | |
| 5,383,723 A | 1/1995 | Meyer | |
| 5,680,145 A * | 10/1997 | Thomson et al. | 343/915 |
| 5,956,917 A | 9/1999 | Reynolds | |
| 6,050,526 A | 4/2000 | Stribling, Jr. | |
| 6,065,267 A | 5/2000 | Fisher | |
| 6,164,786 A | 12/2000 | Lloyd | |
| 6,205,739 B1 | 3/2001 | Newlin | |
| 6,332,657 B1 | 12/2001 | Fischer | |
| 6,498,290 B1 | 12/2002 | Lawheed | |
| 6,550,209 B2 * | 4/2003 | Meguro et al. | 52/653.1 |
| 6,618,025 B2 * | 9/2003 | Harless | 343/915 |
| 6,691,701 B1 | 2/2004 | Roth | |
| 6,814,184 B1 | 11/2004 | Blinn, Jr. | |
| 7,530,201 B2 | 5/2009 | Reynolds et al. | |
| 7,658,356 B1 * | 2/2010 | Nehls | 248/300 |
| 7,968,791 B2 | 6/2011 | Do et al. | |
| 8,322,333 B2 | 12/2012 | Marcotte et al. | |
| 8,615,960 B2 | 12/2013 | Marcotte et al. | |
| 8,669,462 B2 * | 3/2014 | Almogy et al. | 136/246 |
| 2002/0179138 A1 | 12/2002 | Lawheed | |
| 2003/0051750 A1 | 3/2003 | Lawheed | |
| 2003/0201008 A1 | 10/2003 | Lawheed | |
| 2004/0045596 A1 | 3/2004 | Lawheed | |
| 2004/0107669 A1 * | 6/2004 | Francom | 52/697 |
| 2004/0216734 A1 | 11/2004 | Lawheed | |
| 2006/0175129 A1 | 8/2006 | Brinkmann et al. | |
| 2006/0277843 A1 | 12/2006 | Livingston et al. | |
| 2007/0011983 A1 * | 1/2007 | Reynolds et al. | 52/633 |
| 2007/0253766 A1 | 11/2007 | Packer et al. | |
| 2008/0035196 A1 * | 2/2008 | Monus et al. | 136/251 |
| 2008/0072516 A1 | 3/2008 | Reynolds et al. | |
| 2008/0127595 A1 | 6/2008 | Reynolds et al. | |
| 2008/0204352 A1 | 8/2008 | Reynolds et al. | |
| 2008/0236567 A1 | 10/2008 | Hayden | |
| 2009/0000220 A1 * | 1/2009 | Lenox | 52/173.1 |
| 2009/0032089 A1 * | 2/2009 | Chen et al. | 136/251 |
| 2009/0065046 A1 * | 3/2009 | DeNault | 136/248 |
| 2009/0087255 A1 | 4/2009 | Jorna | |
| 2009/0095283 A1 | 4/2009 | Curtis et al. | |
| 2009/0101195 A1 | 4/2009 | Reynolds et al. | |
| 2009/0194657 A1 | 8/2009 | Vazquez Ingelmo et al. | |
| 2010/0005752 A1 * | 1/2010 | Hawkins et al. | 52/655.1 |
| 2010/0050560 A1 * | 3/2010 | Werner et al. | 52/693 |
| 2010/0051021 A1 * | 3/2010 | Kunz | 126/694 |
| 2010/0213704 A1 | 8/2010 | Burger et al. | |
| 2011/0023940 A1 | 2/2011 | Do et al. | |
| 2011/0073104 A1 | 3/2011 | Dopp et al. | |

FOREIGN PATENT DOCUMENTS

| | | |
|---|---|---|
| FR | 2 917 237 A1 | 12/2008 |
| WO | 02/097341 A1 | 12/2002 |
| WO | 2004/083741 A2 | 9/2004 |
| WO | 2007/129146 A1 | 11/2007 |
| WO | 2010/105111 A1 | 9/2010 |
| WO | 2011/011728 A1 | 1/2011 |

OTHER PUBLICATIONS

International Search Report and Written Opinion of PCT/US2010/043118 mailed on Nov. 17, 2010, 16 pages.

U.S. Appl. No. 61/228,480, filed Jul. 24, 2009.

* cited by examiner

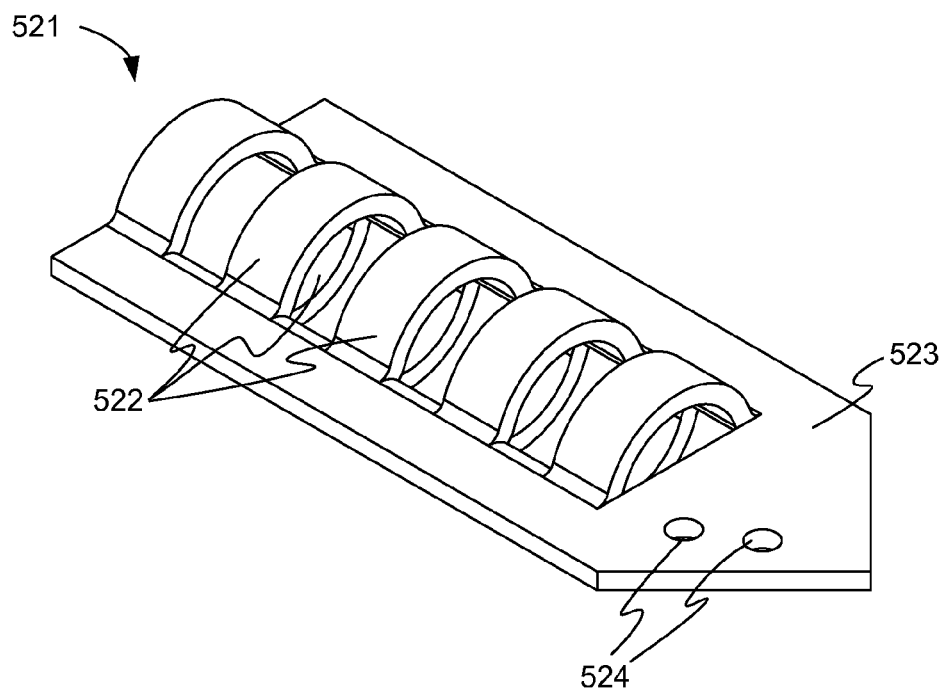
FIG. 5F
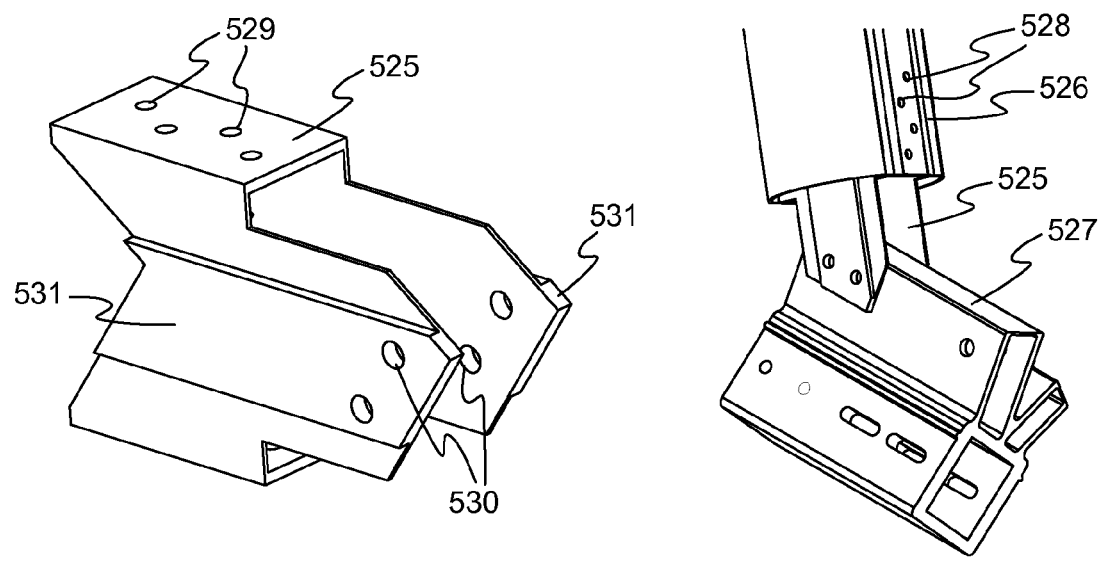
FIG. 5G
FIG. 5H

SOLAR COLLECTOR MODULE

CROSS REFERENCE TO RELATED APPLICATIONS

This application is a divisional of and claims priority to U.S. patent application Ser. No. 13/386,874 filed May 16, 2012 and titled "Solar Collector Module," which is a national stage entry of PCT Application number PCT/US2010/043118, filed Jul. 23, 2010, and titled "Solar Collector Module," which claims priority to provisional U.S. Patent Application No. 61/228,480, filed Jul. 24, 2009 and titled "Solar Collector Module," the entire disclosures of which are hereby incorporated herein by reference for all purpose.

BACKGROUND

The trough solar collector is a well-known collector technology used for Concentrating Solar Power (CSP) plants. As shown in FIG. 1, such a plant typically employs a large array of sun-tracking, focusing reflectors that concentrate incoming solar radiation onto a tubular conduit that contains a working fluid. The focused radiation heats the working fluid, for example an oil or other fluid. The heated working fluid is piped to a central location where its accumulated thermal energy may be utilized in a conventional heat engine, for example to generate steam that drives turbines to produce electric power. In other applications, the heated working fluid may be used directly, for example where the working fluid is heated water for domestic or commercial use. After its thermal energy has been utilized, the working fluid may be recirculated through the collector array to be heated again.

The collector arrays may be quite large, covering several square kilometers and including thousands of collector modules, such as the module 101 shown in the simplified diagram of FIG. 1. Several modules are shown in FIG. 1, each of which has a similar construction. The field or array of collectors may be divided into parallel circuits, so that the working fluid need not be circulated through the entire collector field before it is piped to the central location, but instead may be passed through a single row of a few dozen modules during each heating cycle, for example. Many arrangements of circuits are possible. Each module typically includes a parabolic reflector 102 backed by a frame or truss system 103 on the back side of the reflector (away from the sun). The frame adds rigidity to the module. The modules are typically supported on pylons 104 that are located between the modules.

The collector modules are typically grouped into rotatable solar collector assemblies (SCAs) of several adjacent modules each, connected in a row. That is, an SCA typically includes several collector modules supported by pylons in a linear arrangement, such that the collector modules in each SCA can rotate about a longitudinal axis. For optimum collection efficiency, all the modules in an SCA preferably rotate in unison to track the sun during the day. Each SCA may be moved by a drive mechanism (not shown) near the center of the SCA, at an end of the SCA, or at another location within the SCA. The collector modules in an SCA may be coupled to each other using a conventional torque transfer assembly that includes a central torsion element (shaft) to couple adjacent modules. Alternatively, adjacent modules may be coupled near their edges or rims, so that torque is transmitted between the modules primarily by a force couple acting at the rim and axis of rotation, rather than by torsion of a central shaft. Preferably, the coupling between modules accommodates thermal expansion and contraction of the SCA. More description of systems and methods for "edge drive" torque transfer may be found in co-pending U.S. patent application Ser. No. 12/416,536 filed Apr. 1, 2009 and titled "Torque Transfer Between Trough Collector Modules", the entire disclosure of which is hereby incorporated herein by reference for all purposes.

Torque from at least two different sources is transferred between modules. First, a drive mechanism located near the center of the SCA applies torque directly to those modules adjacent to the drive mechanism. For the rest of the modules in the SCA, torque is coupled from one module to the next so that the entire group of modules in the SCA rotates in unison. Second, the module arrays are also subject to wind loading, which may exert very large forces and torques on the array. Wind loading on each module is transmitted to the adjacent module. The resulting torque may be smallest at the end modules of an SCA, but may accumulate through the modules in the SCA row until the drive mechanism must resist the accumulated torsional wind loading of many modules. These torques may be as large as hundreds of thousands of Newton-meters. In order to maintain proper aiming of the array toward the sun, the drive mechanism must be able to resist and overcome the torque resulting from wind loading, and the SCA must be stiff enough that no modules deflect enough from optimum aiming that their energy collection performance is degraded significantly. While the torques are greatest near the drive mechanism, and the modules adjacent the drive mechanism must resist the largest torques, the deflection may accumulate outward from the drive mechanism, and may be greatest at the end of the SCA furthest from the drive mechanism.

In order to achieve enough stiffness, the frame or truss system 103 should be designed to withstand the expected torques with acceptably small deflection. Also, the coupling of two or more optically-precise devices, such as the modules of an SCA, requires that the assembly be fabricated with a relatively high degree of precision for proper energy collection. In addition, it is desirable that each module be light in weight, easy to assemble, and low in cost. In large part, these competing design goals—stiffness, accuracy, light weight, ease of assembly, and low cost—are dependent on the design of the frame or truss portion of the collector modules. There is accordingly a need for improved frame designs for use in solar collector modules.

SUMMARY

Embodiments of the invention relate to improvements in the design and construction of concentrating solar collector modules. Aspects of the invention include improvements in the layout of a frame for a solar collector module, and in the joining of structural members of the frame at nodes.

According to some embodiments, a hub is configured to join frame members in a space frame truss. the hub includes a main portion and at least one tab protruding from the main portion, the tab having two spaced apart outer sides and a spanning surface joining the outer sides. A tab width extends across the outer sides at that main portion and a tab height extends from the spanning surface to the main portion, and the tab has an aspect ratio that is the ratio of the width of the tab to the height of the tab, and the aspect ratio is between 0.25 and 4.0.

According to other embodiments, a connection at a node of a space frame truss comprises a generally tubular elongate frame member having a constant cross sectional shape along its length. The frame member comprises two generally flat sides defining a portion of the cross sectional shape of the frame member and at least one joining side that extends between the two generally flat sides for closing the tubular frame member cross sectional shape. A portion of the frame member joining side at an end of the frame member is removed such that the two generally flat sides protrude beyond the remainder of the frame member. The connection further comprises a hub having a main portion and a protruding tab, the tab having two spaced apart outer sides and a top surface joining the outer sides, and the two flat sides of the frame member and the two outer sides of the tab are cooperatively sized such that the two protruding flat sides of the frame member fit over the tab.

According to other embodiments, a connection at a node of a space frame truss comprises a hub having a main portion and a protruding tab, the tab having two spaced apart outer sides and a spanning surface joining the outer sides. The connection also includes a tubular frame member and at least one connector fixed to the frame member to form a frame member assembly. The connector protrudes from an end of the frame member and includes at least one feature for assembling the connector to the tab.

According to other embodiments, a solar collector module comprises a reflector configured to direct incoming solar radiation onto a receiver, and a three-dimensional structural frame to which the reflector is mounted. The frame includes a plurality of interconnected substantially rigid elongate frame members, and frame has two ends. The frame also includes at each end a fitting displaced from an axis of rotation of the module, each fitting configured to participate in the transfer of torque between the module and an adjacent module via a direct connection between the modules at a location displaced from the axis of rotation. The three-dimensional structural frame is asymmetrical about a central longitudinal plane.

According to other embodiments, a solar collector module, comprises a reflector configured to direct incoming solar radiation onto a receiver and a three-dimensional structural frame to which the reflector is mounted. The frame includes a plurality of interconnected substantially rigid elongate frame members connected at nodes. The three-dimensional structural frame comprises an upper surface defined by a set of upper nodes and a lower surface defined by a set of lower nodes, with each lower node being connected to at least one upper node by a strut. The solar collector module also includes a monolithic hub at each node to which each frame member reaching the respective node is connected, and no frame member reaches more than two nodes.

According to other embodiments, a three-dimensional structural frame comprises a set of upper nodes defining an upper surface, the upper nodes arranged in generally longitudinal rows, and a set of lower nodes defining a lower surface, the lower nodes arranged in generally longitudinal rows. The frame also includes a plurality of substantially rigid elongate struts, and each node in the upper surface is connected to at least one node in the lower surface by at least one of the plurality of struts. The frame further includes at least one substantially rigid elongate chord member extending to at least two nodes in a particular row of nodes, the chord member having a substantially constant cross sectional shape throughout its length. The chord member further comprises at least one strut connection feature such that any strut connecting to any node in the particular row of nodes connects to the chord member.

According to other embodiments, a three-dimensional structural frame comprises a set of upper nodes defining an upper surface, the upper nodes arranged in generally longitudinal rows and a set of lower nodes defining a lower surface, the lower nodes arranged in generally longitudinal rows. The frame further includes a plurality of substantially rigid elongate struts, wherein each node in the upper surface is connected to at least one node in the lower surface by at least one of the plurality of struts, and at least one substantially rigid elongate chord member extending to at least two nodes in a particular row of nodes, the chord member having a substantially constant cross sectional shape throughout its length. The frame also includes, at a node reached by the chord member, at least one channel having a throat and two spaced apart sides. The channel is affixed at the throat to an outside surface of the chord member, and each channel is configured to receive at least one strut reaching the respective node, to connect the at least one strut to the respective node.

According to other embodiments, a solar collector module comprises a reflector configured to direct incoming solar radiation onto a receiver, and a three-dimensional structural frame to which the reflector is mounted. The frame comprises a plurality of interconnected substantially rigid elongate frame members, wherein the frame members are connected at nodes. The frame comprises an upper surface defined by a set of upper nodes and a lower surface defined by a set of lower nodes, each lower node connected to at least one upper node by a strut, and the nodes are arranged in generally longitudinal rows. The solar collector module further includes at least one substantially rigid elongate chord member in each row of the upper surface, connecting least two nodes in the respective row, and a plurality of discrete standoffs affixed to the chord members in the top surface, the standoffs at least partially supporting the reflector.

Other features and advantages of the present invention should be apparent from the following description of the preferred embodiments, which illustrate, by way of example, the principles of the invention.

BRIEF DESCRIPTION OF THE DRAWINGS

FIGS. 5A-5L illustrate connectors, according to embodiments of the invention, for connecting frame members to hubs.

DETAILED DESCRIPTION

In general, embodiments of the invention relate to improvements in the design of a truss or frame for a solar collector module.

FIGS. 2A, 2B, 2C, and 2D show lower oblique, bottom, end, and side views respectively of a solar collector module 200, in accordance with an example embodiment of the invention. Certain parts of the module 200 are omitted for clarity of explanation, but the module 200 will serve to illustrate the overall structure of a module, and some terms used to describe portions of a module.

Figure 1:
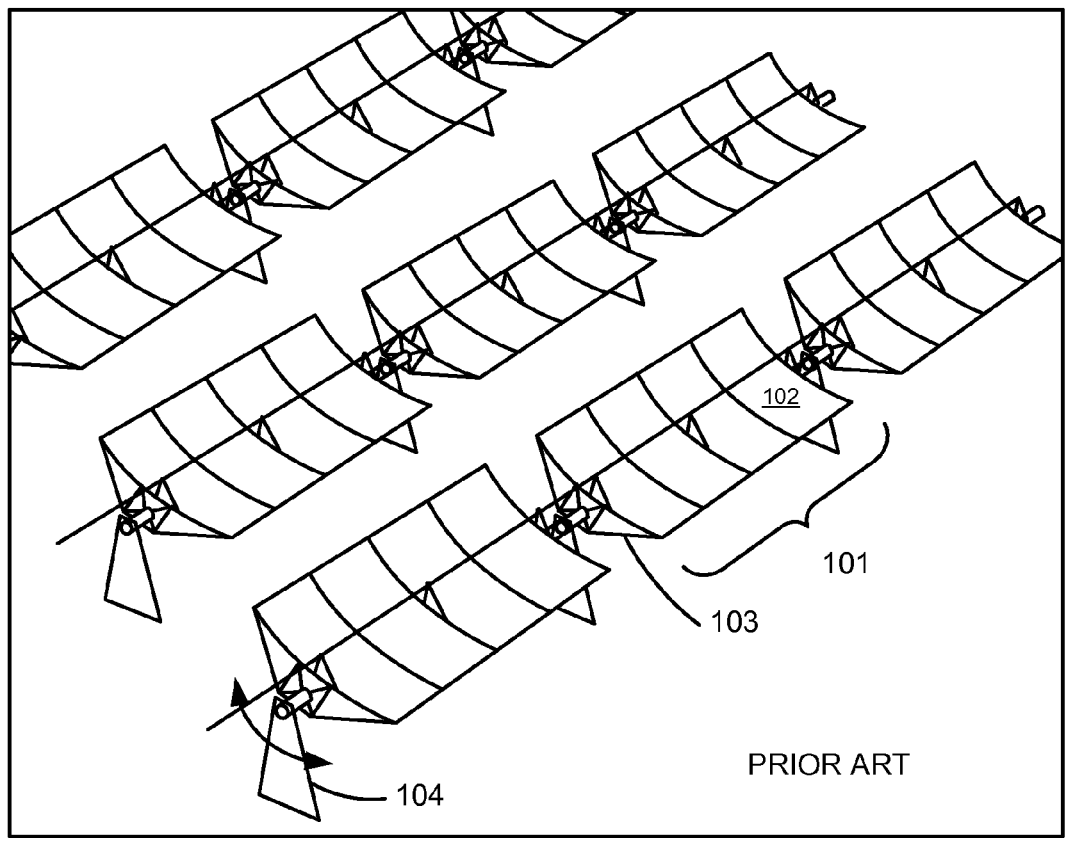
FIG. 1 depicts a schematic view of a portion of a concentrating solar power plant.
Figure 2A:
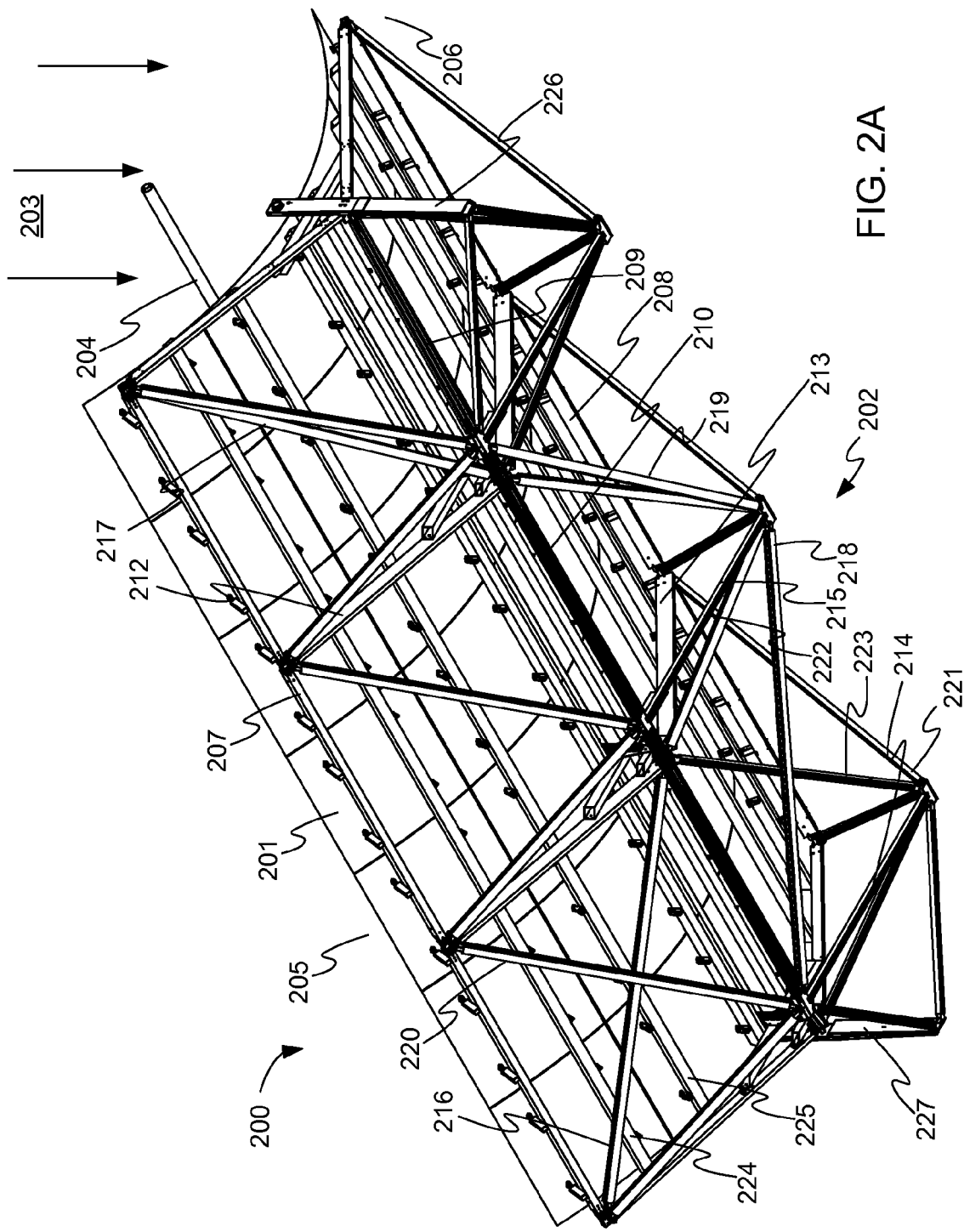
FIGS. 2A-2D show oblique, bottom, end, and side views respectively of a solar collector module, in accordance with example embodiments of the invention.
Figure 2B:
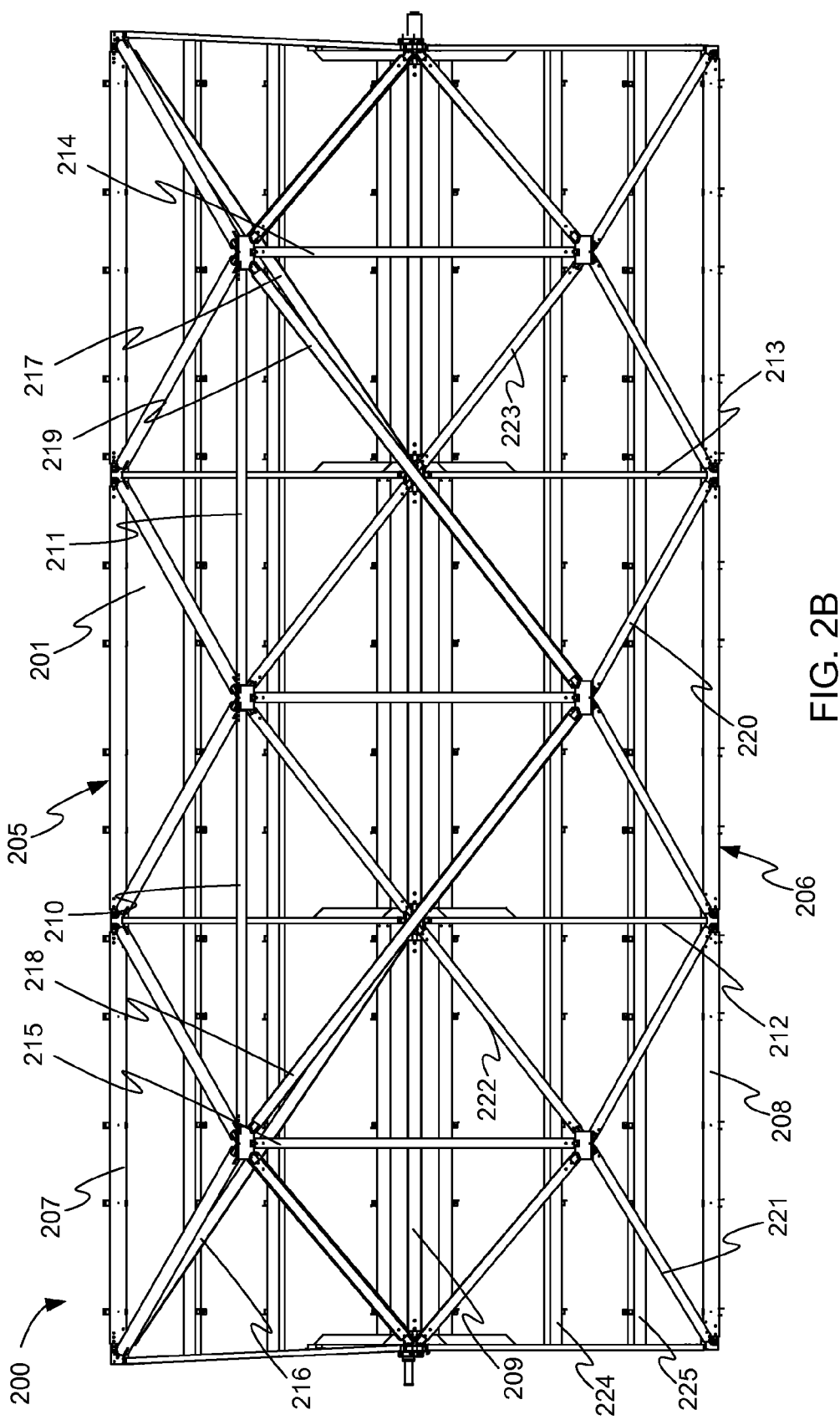
Figure 2C:
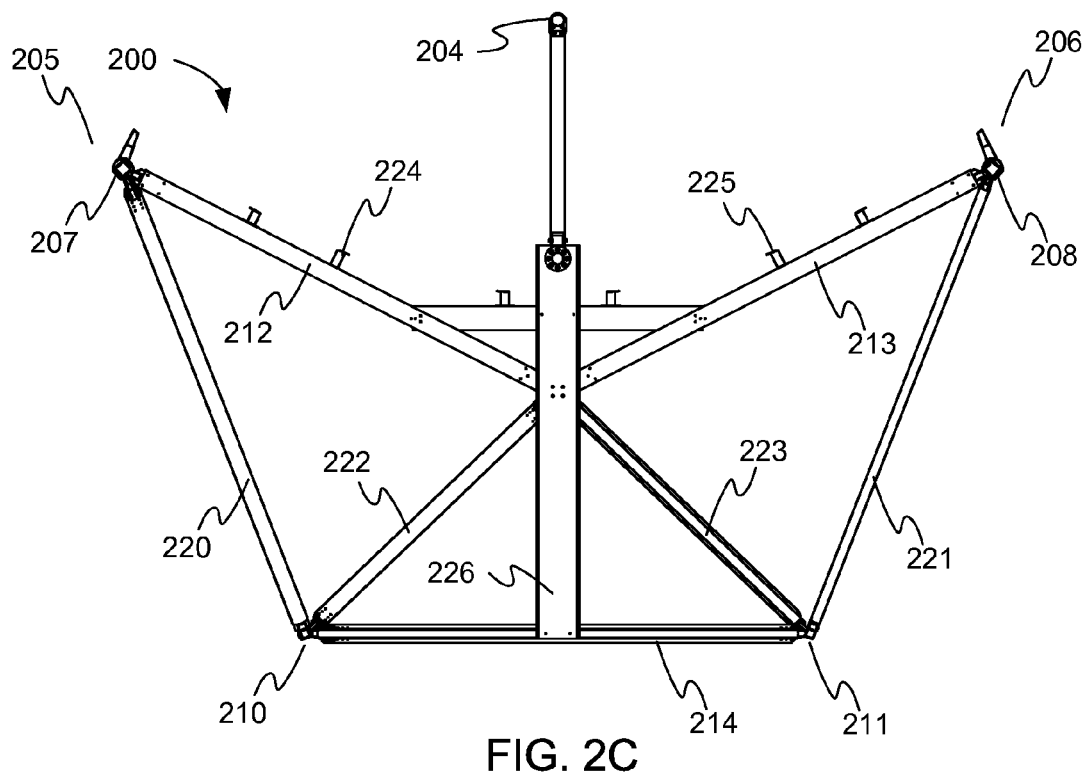
Figure 2D:
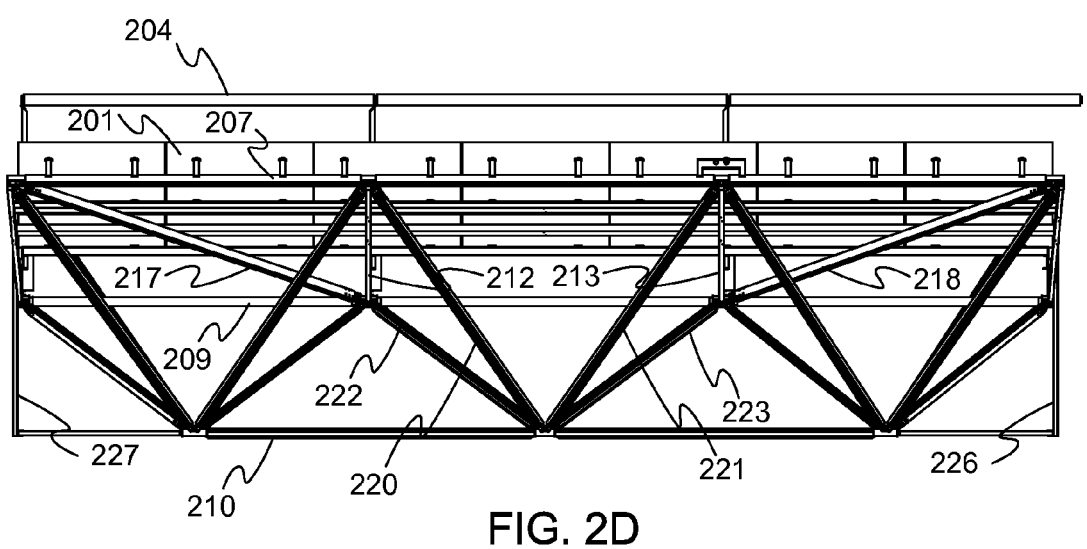

Referring to FIGS. 2A-2D, the solar collector module 200 includes a reflector 201 and a frame 202. The reflector 201 may be, for example, in the shape of a parabolic cylinder or other curved shape configured to receive incoming solar radiation 203 and concentrate it onto a linear receiver tube 204 that carries the working fluid. The reflector 201 may be made, for example, of a single piece of reflective material, for example plated or polished sheet steel or aluminum, glass mirrors, or another highly reflective material, or may be made of multiple pieces. In a preferred embodiment, the reflector is made of multiple curved glass mirror segments that cooperate to define the curved shape of the reflector 201. In FIG. 2C, the reflector 201 is omitted for purposes of illustration of the module components.

While embodiments are described in relation to a curved reflector that concentrates solar radiation onto a receiving tube, it will be recognized that other embodiments may utilize other reflector shapes, for example a flat reflector that is part of a heliostat directing solar radiation onto a remote receiver.

The module 200 has a length, measured in a longitudinal direction parallel to an axis of the curved cylinder defined by the reflector 201. The module 200 has a width, measured transverse to the length and between edges 205 and 206. In a typical power generation application, each module may be about 8 or 12 meters in length, and about 3.5 or 5 meters in width, although other sizes and aspect ratios are possible.

The reflector 201 is mounted to the frame 202, which imparts the stiffness and strength to the module to maintain the proper shape and orientation of the reflector 201. The frame 202 may be thought of as a space frame truss, composed of multiple members joined at nodes of the truss. There may be at least four different kinds of truss members: chords, ribs, diagonals, and struts. In addition, other kinds of members may be present, for example purlins and torque arms.

As is most easily seen in FIGS. 2A and 2B, chords or chord members run in the longitudinal dimension of the frame 202, and lie in the surfaces of the space frame truss making up the frame 202. In the example module 200, there are three upper chord locations, including two upper rim chord locations in which chord members 207 and 208 (and other chord member) reside, and a center chord location, in which chord member 209 resides (along with other chord members). There are also two bottom chord locations, in which chord members 210 and 211 (and other chord members) reside. Other numbers of chords are possible. In some embodiments, each upper chord is a single chord member that runs the length of the frame 202, and the lower chords are somewhat shorter than the length of the frame 202. As will be explained in more detail later, in other embodiments, multiple chord members are placed along a chord location.

Ribs run generally transverse to the chords, and are connected between adjacent chords. For example, upper ribs such as ribs 212 and 213 lie in the upper surface of the frame 202, each connecting one of the rim chords to the upper center chord 209. Bottom ribs such as ribs 214 and 215 lie in the bottom surface of the frame 202 and connect the bottom chords 210 and 211.

Diagonals also lie in the frame surfaces, but are connected diagonally between non-aligned nodes. Examples are illustrated by upper diagonals 216 and 217, and lower diagonals 218 and 219.

Struts generally connect between the two surfaces of the frame 202. For example, a strut may connect to a node in the upper surface and a node in the lower surface of the frame 202. (In an occasional exception, lower diagonals may sometimes be referred to as bottom struts.) As most easily seen in FIG. 2C, outer struts, exemplified by struts 220 and 221 connect between nodes along the rim chords 207 and 208 and the bottom chords 210 and 211. Inner struts, exemplified by struts 222 and 223, connect between the center chord 209 and the bottom chords 210 and 211.

The locations in the frame 202 where frame members meet are referred to as nodes. In some embodiments, a fitting is present at each node to facilitate the connections of the various frame members meeting at the respective node. This fitting may be referred to as a hub or node connector, and may be a unitary piece or made up of multiple pieces.

In addition, purlins, exemplified by purlins 224 and 225, may run lengthwise on the top surface of the frame 203, and may provide mounting surfaces for the segments of the reflector 201. Finally, torque arms 226 and 227 may be provided at the ends of the module 200, for assisting in holding the receiver tube 204 in the proper location and moving the receiver tube 204 as the module 200 rotates.

While the example module 200 serves to illustrate some of the terminology used to describe module features, it should be understood that not every embodiment will include all of the features shown in the module 200, and other embodiments may include similar features in somewhat different configurations than shown in FIGS. 2A-2D.

Hubs

Figure 3A:
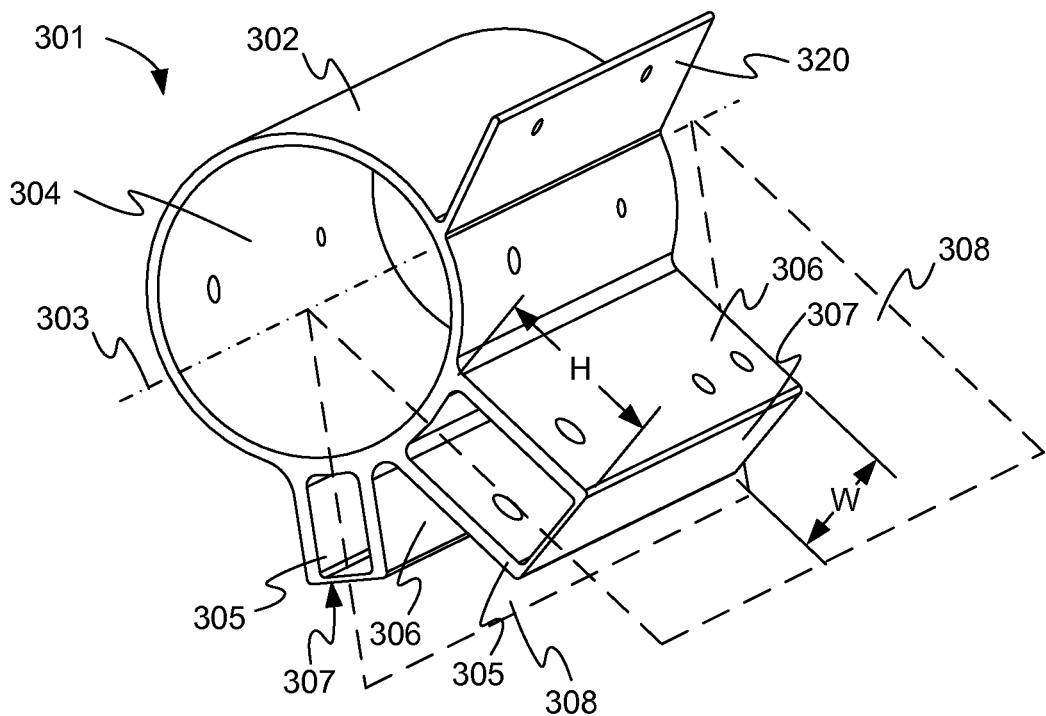
FIGS. 3A-3G depict hubs for connecting members of a frame at nodes, in accordance with embodiments of the invention.

FIG. 3A depicts a hub 301 in accordance with an example embodiment of the invention. The hub 301 is particularly suited for connecting struts, ribs, and diagonals to an upper rim chord, but the principles illustrated by the hub 301 may be embodied in hubs for use in other locations in a frame such as the frame 202. The example hub 301 includes a main body portion 302 having a longitudinal axis 303. The main body portion 302 encloses an open passage 304 through which a chord or other frame member may pass. The passage 304 may have a size and cross-sectional shape that match the profile of the chord, which may have any suitable cross sectional shape, including round, square, oblong, generally round with flattened sides, or another shape. The hub 301 has integral box-shaped tabs 305, configured to be captured by frame members or frame member end pieces. Other prior hubs capture frame members between opposed parallel fins, or utilize single, thin fins that have limited strength. A single fin 320 is illustrated in FIG. 3A for purposes of illustration. The hub 301 may be manufactured using an extrusion process. The configuration of the hub 301 with the box-shaped tab 305 minimizes the size of the hub cross-section (an important element of the extrusion process), allows utilization of larger frame members that need not fit between fins, provides pairs of stable surfaces to which conjoining frame members may be fastened, and makes the tab elements stronger and more dimensionally-stable during fabrication and field operation.

Each of the tabs 305 comprises spaced-apart outer sides 306 and a spanning surface 307 joining the outer sides 306. (The transitions between the sides and top surface may be rounded, chamfered, or otherwise shaped to ease the transition over a small distance, but the spanning surface 307 is still considered to join the sides 306.) Each tab 305 has a width W and a height H, and an aspect ratio W/H. Not all tabs on a hub need have the same dimensions. For the purposes of this disclosure, the width of a tab is measured at the root of the tab, adjacent the main portion 302 of the hub 301, between the sides 306 and the height of the tab is measured from the outer surface of the main portion 302 at the root of the tab to the spanning surface 307. The aspect ratio W/H of each tab is preferably between 0.25 and 4.0, and more preferably between 0.33 and 3.0, and even more preferably between 0.5 and 2.0. In any case, each tab is wider than a thin fin, and has a width that is substantial in relation to its height. By contrast, a traditional fin has a width that is much smaller than its height. The size and orientation of the tabs 305 can be varied depending on the size of the member(s) or terminations(s), and on the desired frame geometry. In the example hub 301, the tabs 305 are hollow. For added strength, the tabs may be internally reinforced, or even made solid. The hub 301 may be referred to as a "tabbed" hub. The lengths of a particular hub and its tabs may be selected as necessary to accommodate the number of frame members meeting at the particular hub.

In some embodiments, each of the tabs 305 is positioned so that the lines of action of the frame members attached to a particular tab pass through a common point within the hub, so that joint eccentricity is avoided. This may be accomplished in part, for example, by having each tab be symmetrical about a respective plane of symmetry 308, and arranging for each of the planes of symmetry to include the longitudinal axis 303 of the main portion.

The hub 301 is conveniently made of extruded aluminum, although other materials and processes may be used. For example, the hub 301 may be cast, welded together, or otherwise formed from aluminum, steel, a polymer, a composite, or another suitable material. In some embodiments, the tabs 305 may be attached using fasteners or other means, for example rivets, screws, bolts, adhesive bonding, welding, or an integral attachment feature such as a dovetail joint.

Figure 3B:
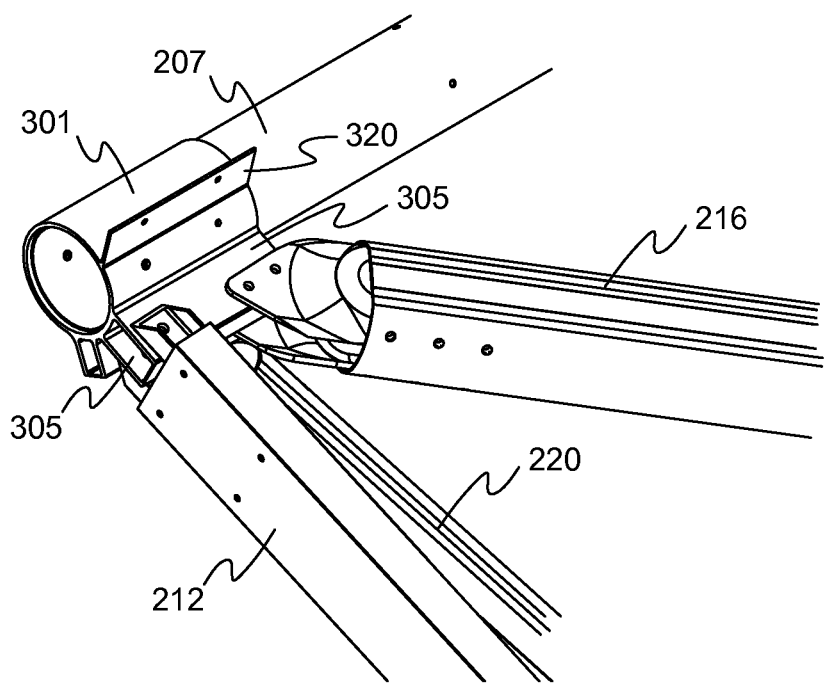
Figure 3C:
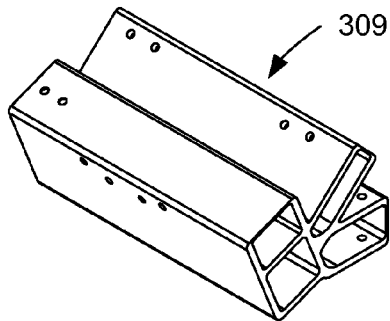
Figure 3D:
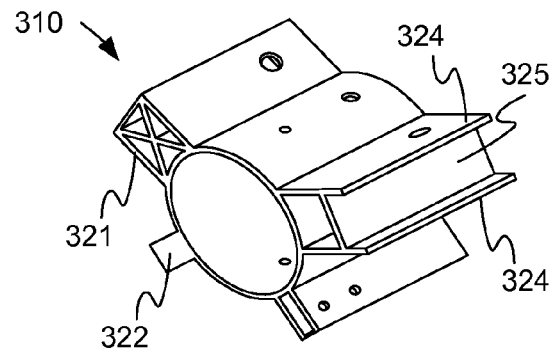
Figure 3E:
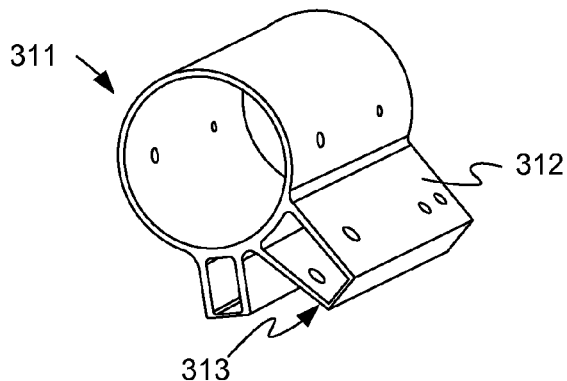

FIG. 3B illustrates the hub 301 in use to connect an upper rib 212, an upper diagonal 216, and a strut 220 to the rim chord 207. The various frame members may be attached to the hub 301 using pins, bolts, rivets, screws, or other suitable fasteners. Tabs 305 may include holes for receiving fasteners. FIGS. 3C and 3D illustrate two other hub configurations 309 and 310, particularly useful along a bottom chord and an upper center chord respectively. In addition, FIG. 3D illustrates some other tab configurations in accordance with embodiments, including an internally reinforced tab 321 and a solid tab 322. Tab 323 includes protrusions 324 that protrude beyond spanning surface 325, which joins the outer sides of the tab 323. The tab 323 is still considered to be a box-shaped tab within the scope of the appended claims. In the examples shown thus far the side walls of the tabs are planar and parallel, the top surface is planar, and the box-shaped tabs are generally rectangular in cross section. Other shapes are possible, including box shapes with non-parallel sides, sides of different lengths, non-constant cross sectional shapes, or other suitable shapes. For example, FIG. 3E illustrates a hub 311 having a tab 305 with non-parallel sides 312 and 313.

Figure 3F:
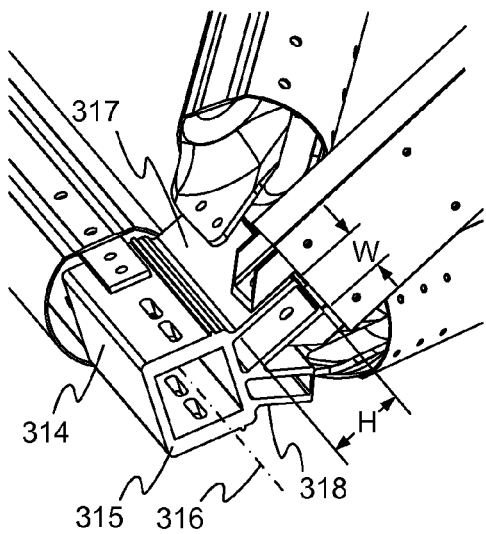
Figure 3G:
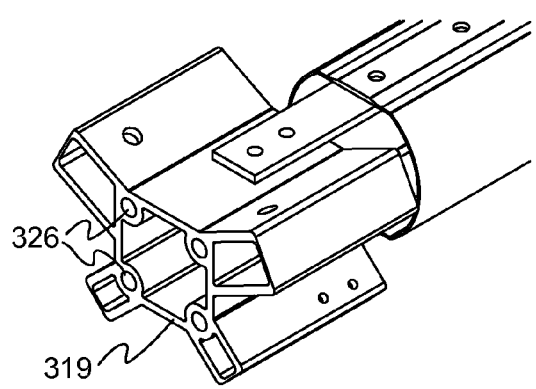

FIG. 3F illustrates another example hub 314 having tabs. The hub 314 includes a main portion 315 having a longitudinal axis 316. Tabs 317 and 318 protrude from the main portion and extend in a direction parallel to the longitudinal axis. The hub 314 does not include a passage configured to receive a frame member through the passage. Each tab may have a width and a height and an aspect ratio that is the ratio of the width to the height. The aspect ratio is preferably between 0.25 and 4.0, and more preferably between 0.33 and 3.0, and even more preferably between 0.5 and 2.0. FIG. 3G illustrates yet another example hub 319 having tabs. Conveniently, a hub may include mounting holes such as mounting holes 326 shown in the hub 319, for attaching torque arms and the like.

While the exemplary hubs shown in FIGS. 3A-3G are conveniently made by extrusion and therefore have longitudinal axes, this is not a requirement. For example, hubs according to embodiments of the invention could be made by casting or other processes, and may not necessarily have shapes formable by extrusion. For example, a hub designed to be used in a node similar to the node shown in FIG. 3F could have a generally hemispherical base shape with a tab protruding in the direction of each frame member to be attached to the hub. Many other configurations and manufacturing processes may be utilized.

Frame Member End Designs

In some prior designs, all of the frame members in a given plane were of the same cross sectional size and shape, which necessarily were selected based on the requirements of the frame member expected to carry the highest load. As such, other frame members were overdesigned, and the cost, weight, and material requirements for such a frame were unnecessarily high. this limitation also constrained the range of frame member sizes available to the designer to those which could interface with a realistically manufacturable hub, thereby limiting the members' ability to carry axial compression loads over long distances and imposing limits on the geometric layout of the overall frame.

Preferably, each frame member in a collector module frame embodying the invention is sized appropriately for the load it is expected to carry. In some embodiments, the frame members are generally tubular. Any particular frame member may be round, oval, rectangular, square, generally round with flattened sides, or of another cross sectional shape. The frame members need not all be of the same shape or size. For example, one frame member may have a different wall thickness than another frame member, or may have a significantly different diameter than another frame member, or may differ in other ways. Because the frame members may vary in size and shape, various ways of connecting the frame members to the hubs may be used within a single module.

Figure 4:
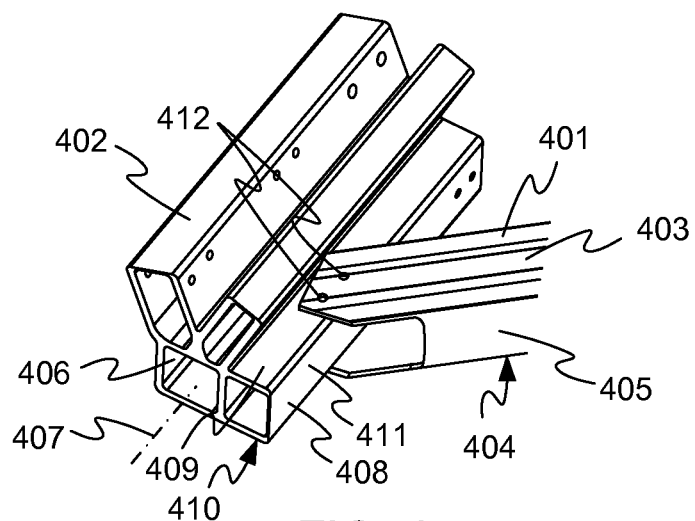
FIG. 4 depicts a connection of a frame member to a hub, in accordance with embodiments of the invention.

FIG. 4 illustrates one example technique for attaching a frame member 401 to a hub 402. The frame member 401 may be, for example, a strut, rib, or diagonal. The example frame member 401 is generally tubular, and has a constant cross sectional shape along its length, as conveniently results if the frame member 401 is extruded. The frame member 401 has two generally flat sides 403 and 404. (Part of each of generally flat sides 403 and 404 has been thickened for reinforcement, but the two sides are still considered to be generally flat.) The remainder of the cross section, such as joining side 405, may have any suitable shape, for example curved or straight portions making up the remainder of the periphery of the tubular member. The example hub 402 is similar to the hubs described above, and comprises a main portion 406 that has a longitudinal axis 407, indicated by a dashed line. One of skill in the art will recognize that the connection technique shown in FIG. 4 could be used with other kinds of hubs as well, for example hubs that include a passage through which a frame can be received. The hub 402 also comprises a tab 408 that has two spaced apart outer sides 409 and 410, and a spanning surface 411 that joins the outer sides 409 and 410. The generally flat sides 403 and 404 of the frame member are cooperatively sized with the two outer sides 409 and 410 of the tab 408 such that the two generally flat sides 403 and 404 of the frame member 401 can straddle the tab 408, preferably in a sliding, loose sliding, or clearance fit. For example, a tab may have a nominal width of between 30 and 100 millimeters, and generally flat sides 403 and 404 of the frame member may be nominally spaced apart by a distance about 0.1 to 3.0 millimeters greater than the width of the tab to which the frame member is to be connected.

Other parts of the frame member 401 are removed so that the generally flat sides 403 and 404 protrude beyond the remainder of the frame member. Tab 408 may have an aspect ratio (its width divided by its height) of between 0.25 and 4.0. One or more fasteners such as a pins, rivets, bolts, screws, or other fasteners may be used to join the frame member 401 to the hub 402. A single fastener may be used in a joint that need only react to axial loads in the frame members. Multiple fasteners may be used to create a joint that can also resist moments. FIG. 4 illustrates a joint with multiple holes 412 through the generally flat sides 403 and 404 of the frame member 401, and through the tab 408, for receiving multiple fasteners (not shown).

The kind of connection shown in FIG. 4 makes a connection between the frame member 401 and the hub 402 using a minimum number of parts. No transition members or other connectors are needed. This kind of joint may be especially useful for frame members whose expected loads allow them to be of a size comparable to a suitable tab size on a particular hub. In some cases, it may be possible to specify the wall thickness or other dimensions of the frame member 401 such that the frame member 401 has the appropriate strength and stiffness and also a size compatible with the hub 402. The tab 408 and the frame member 401 may be designed cooperatively to enable use of this kind of connection.

In another embodiment, transitional pieces called "connectors" may be provided between frame members and hubs. A connector is an additional structural element fixed to the frame member, and having features such as holes that facilitate the connection of the frame member to a hub. The combination of the frame member and the connector may be called a frame member assembly.

The connectors may provide various benefits, including easing the transition between the frame member shape and the hub shape, enabling the use of larger frame members, providing additional strength, or other advantages. A wide variety of connector styles is possible. Any workable combination of connector and frame member geometry may be used. For example, frame members maybe round, square, rectangular, generally round with flat sides, or any other suitable shape. Not all of the members in a frame need have the same shape, and not all connections within a frame need use the same connector style.

Figure 5A:
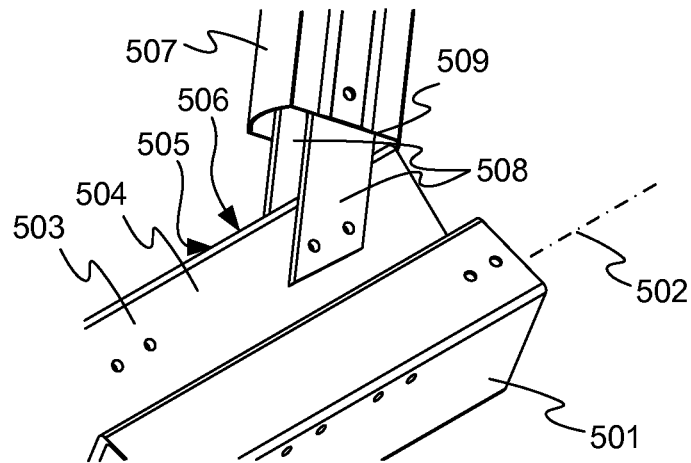

FIG. 5A illustrates a connection in accordance with one embodiment. In the example connection of FIG. 5A, a hub 501 has a longitudinal axis 502 and comprises a protruding tab 503. (When referring to a longitudinal axis of a hub, the axis is a longitudinal axis of the hub itself, and is not necessarily aligned with any longitudinal axis of a frame in which the hub resides.) The tab 503 extends in a direction parallel to the longitudinal axis 502 and has two spaced apart outer sides 504 and 505, and also has a spanning surface 506 joining the two sides 504 and 505. A tubular frame member 507 includes two connectors 508 fixed to the frame member 507 to form a frame member assembly. The connectors 508 are flat plates, affixed to the inside of the tubular frame member 507. The connectors 508 may be, for example, formed from sheet steel or aluminum or another suitable material, by stamping or another suitable process. Each of the connectors 508 includes at least one feature for assembling the connector 508 to the tab 503. In this example, the features are holes through the connectors cooperatively positioned with corresponding holes in the tab 503 to receive a fastener such as a pin, bolt, rivet, screw, or another kind of suitable fastener. Either or both of the connectors 508 could be fixed to the outside of the frame member 507, rather than the inside. The connectors 508 may be fixed to the frame member 507 by any suitable fastening scheme, including welding or the use of fasteners such as rivets, bolts, or screws. The connectors 508 protrude from an end 509 of the frame member 507. One or more connectors may also be provided at the opposite end of the frame member 507. The two connectors 508 are spaced apart to fit over the tab 503, preferably in a loose sliding fit, straddling the sides 504, 505.

Figure 5B:
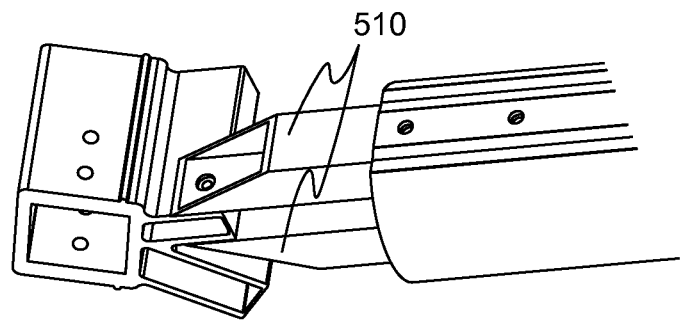

FIG. 5B illustrates a connection in accordance with another example embodiment. In this example, connectors 510 comprise enclosed hollow shapes. While the shapes shown in FIG. 5B are rectangular, one of skill in the art will recognize that other shapes may be used. In the example shown, the ends of the connectors 510 have been additionally formed to provide clearance for connections to other tabs on the hub.

Figure 5C:
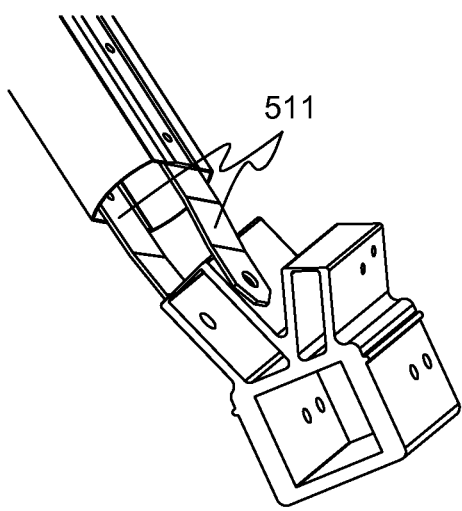
Figure 5D:
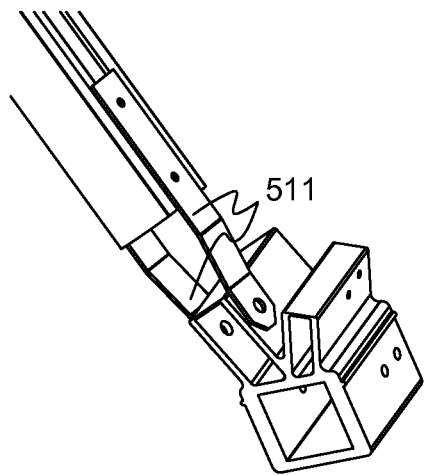

FIGS. 5C and 5D illustrate connections in accordance with other example embodiments. In these examples, the connectors 511 are bent plates. This kind of connector may be especially suited to connecting large frame members to hubs. These embodiments also illustrate that the connectors 511 may be mounted to the inside or outside of the frame member.

Figure 5E:
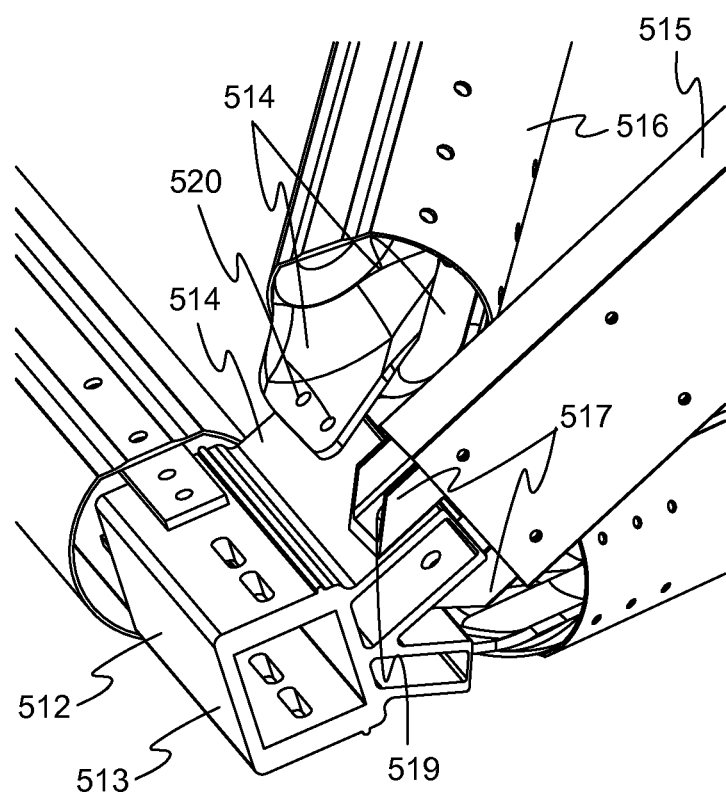

FIG. 5E illustrates connections in accordance with two other embodiments. The connections shown in FIG. 5E include a hub 512 as previously described, having a main portion 513 and a tab 514. Two tubular members 515 and 516 are connected to the tab 514. The connection of the tubular member 515 uses two connectors 517 having open channel shapes fixed to the inside of the tubular frame member 515. In this example, the frame member 515 is rectangular. The connection of the second tubular frame member 516 uses two connectors 518 stamped in compound shapes. That is, the connectors 518 have curvature in two directions. This kind of connector may be especially useful for connection round or near-round frame members such as the frame member 516 to hubs.

FIG. 5E also illustrates connections using single or multiple fasteners. The connection of the frame member 515 uses only a single fastener (not shown) such as a pin, bolt, rivet, or screw through hole 519 and cooperating holes in the tab 514. The connection of the frame member 516 uses two fasteners (not shown) through holes 520 and cooperating holes in the tab 514. This kind of connection is able to withstand moments, as well as axial loads in the framing member 516.

FIG. 5F illustrates a connector 521 in accordance with another embodiment. The connector 521 may be conveniently formed by stamping from a single piece of sheet material such as steel or aluminum. Alternating straps 522 are formed by distending alternating portions of a flat blank toward opposite sides of the blank. The resulting straps 522 are configured to form a receptacle to receive an end of a framing member (not shown). The connector 521 may be fixed to the framing member by welding, rivets, screws, bolts, or any other suitable attachment scheme. The connector 521 includes a flat end portion 523 having features for assembling the connector 521 to a hub (not shown). In this example, the connection features are holes 524 suitable for receiving pins, bolts, rivets, screws, or other fasteners in cooperation with holes in a tab of the hub. Other variations of the connector 521 are also possible. For example, the straps 522 need not be oriented perpendicular to the longitudinal axis of the connector 521, but could be oriented at some other angle. Advantages of such "angled" stamping include ease of assembly and enhanced joint strength.

FIG. 5G illustrates a connector 525 in accordance with other embodiments. The connector 525 is preferably made from an extruded shape having a cross section sized and shaped to fit within a frame member, and modified to fit with the desired hub. The modifications may include notching portions of the extruded shape, and drilling holes for mounting to frame members and hubs. A connector such as the connector 525 can effectively join a large diameter frame member to a relatively small tab on a hub, using a single part. The connector 525 may be fabricated to fit any of a variety of frame member shapes.

FIG. 5H illustrates the connector 525 mounted in a frame member 526 and positioned to attach to a hub 527. Any suitable fasteners may be used to connect the connector 525 to the frame member 526, for example rivets, screws, bolts or pins through holes 528 of the frame member 526 and holes 529 of the connector 525. The connector 525 could also be welded to the frame member 526. Similarly, rivets, screws, bolts, pins or other suitable fasteners may be used to connect the connector 525 to the hub 527, for example via holes 530 in the connector 525 and mating holes in the hub 527. Portions 531 of walls of the connector 525 may be thickened in relation to other walls, to increase the bearing capacity of the connector 525 and reduce the likelihood of material failure at the holes 530 when the connector is under load. The connector 525 may be configured to fit within a frame member having a round interior opening, and thus may be useful for making connections in frames that utilize steel frame members, which may be available in only a limited number of cross sectional shapes.

Figure 5I:
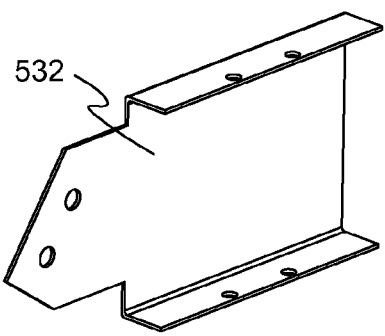
Figure 5J:
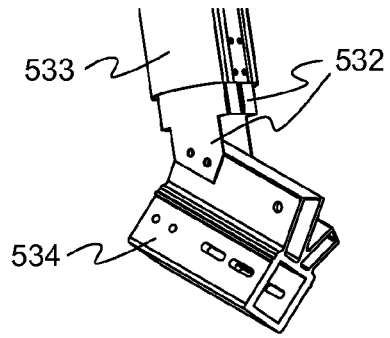

FIG. 5I illustrates a connector 532 in accordance with other embodiments. Connectors such as the connector 532 may be used in mirror image pairs to form a connector similar to the connector 525 described above. FIG. 5J illustrates a connection of a frame member 533 to a hub 534, using a mirror image pair of the connectors 532. The connection shown in FIG. 5J provides many of the advantages provided by the connection shown in FIG. 5H. The connector 532 may also be formed by extrusion, with subsequent notching and drilling, but may also be formed by other methods, for example stamping or bending of sheet metal.

Figure 5K:
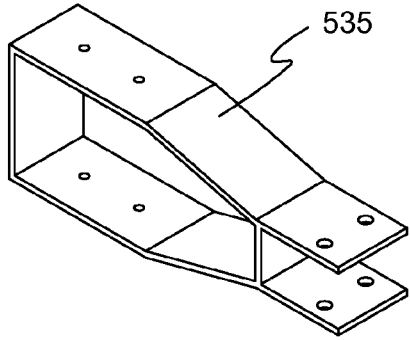
Figure 5L:
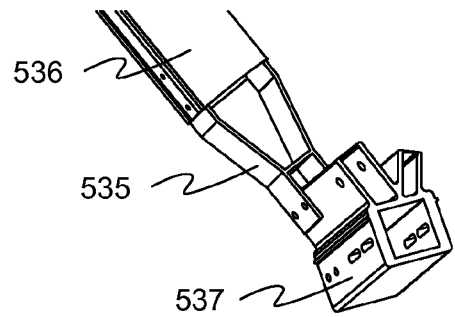

FIG. 5K illustrates a connector 535 in accordance with still other embodiments. The connector 535 may also be formed principally by extrusion and cut to the appropriate length. Holes for mounting the connector 535 to frame members and hubs may be added by drilling or other methods. FIG. 5L illustrates the connector 535 as used to make a connection between a frame member 536 and a hub 537.

Frame Arrangements

Figure 6A:
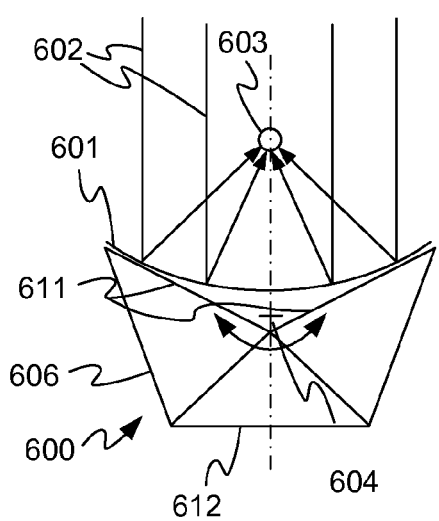
FIGS. 6A and 6B illustrate schematic end and oblique views of a generic collector module.
Figure 6B:
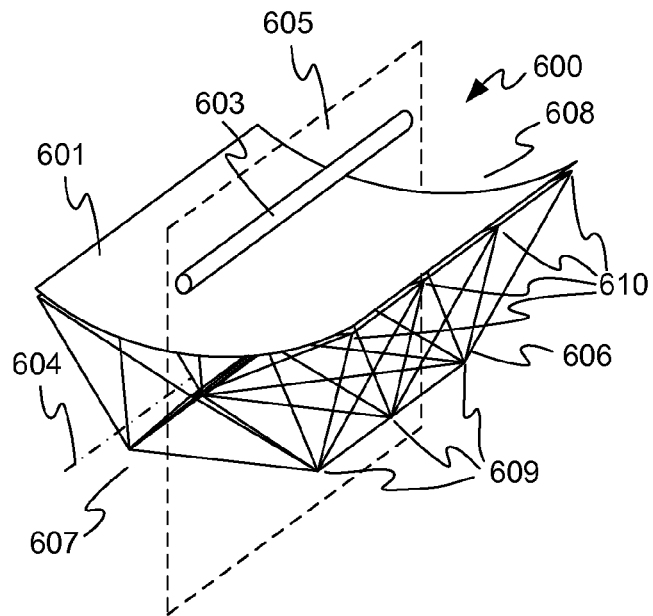

FIGS. 6A and 6B illustrate schematic end and oblique views of a generic solar collector module 600, and serve to illustrate the definitions of some terms useful in describing solar collector modules. The module 600 includes a curved reflector 601 configured to concentrate incoming solar radiation 602 onto a receiving tube 603. The curved reflector 601 may be in the shape of a parabolic cylinder or other curved shape, and the receiving tube 603 may be cylindrical. The curved reflector 601 may be made of a material that is curved before mounting on the module 600, or may be made of a flat planar material that adopts the curved shape when placed on the module 600. The module 600 has an axis of rotation 604, about which the module 600 is rotated to follow the apparent motion of the sun during the day. The receiving tube 603 and the axis of rotation 604 define a central longitudinal plane 605 of the module 600, indicated by dashed lines. The module 600 includes a three-dimensional structural frame 606 to which the curved reflector 601 is attached. The three-dimensional structural frame comprises a plurality of substantially rigid elongate structural members interconnected at nodes. The frame has a first end 607 and a second end 608. The nodes are arranged in generally longitudinal rows. For example, nodes 609 are arranged in a generally longitudinal row. Likewise nodes 610 are arranged in another generally longitudinal row. As will be appreciated, the nodes in a particular generally longitudinal row may be but need not be perfectly collinear, and as is explained in more detail below, may be intentionally designed to be not collinear. The nodes also define an upper surface 611 and a lower surface 612. Each node in one surface is connected by a strut to at least one node in the other surface.

Conventional frame designs, categorically designed around symmetric load input through a torque transfer assembly, are designed to distribute forces as evenly as possible among frame members. This makes member sizes more uniform (facilitating hub connections) and minimizes strength requirements for individual members. This is traditional practice for a space-frame structure.

However a frame designed for transmitting torque to an adjacent frame through a torque transfer connection near an edge or rim of the module is preferably configured in a way that quickly and directly transmits force inputs at one corner across the frame and out to the other corner. The edge or rim drive arrangement is described in pending U.S. patent application Ser. No. 12/416,536, previously incorporated by reference. For the purposes of this disclosure, a direct connection between modules is one that connects the module frames directly through space, without passing through an axle or shaft at the axis of rotation of the SCA including the modules. A direct connection may be made up of more than one part.

Figure 7A:
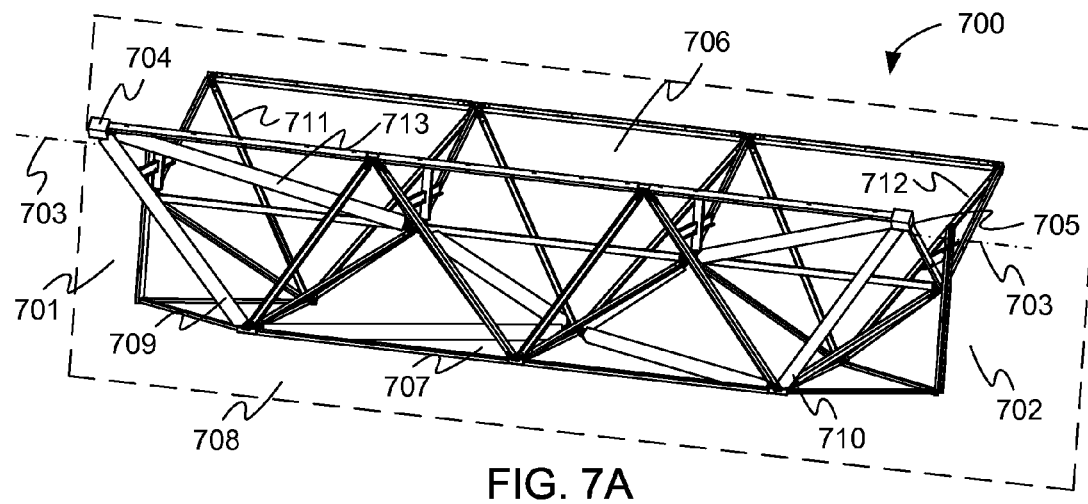
FIGS. 7A-7H depict frames for solar collector modules, in accordance with embodiments of the invention.
Figure 7B:
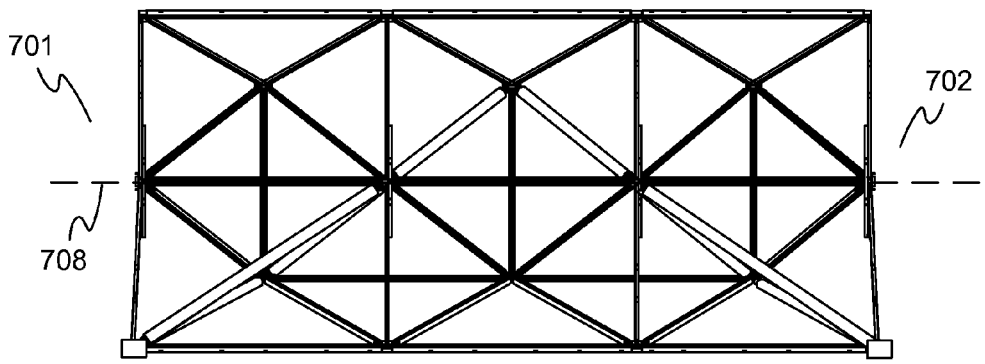

FIGS. 7A and 7B illustrate oblique and top views of a frame 700 in which certain members are reinforced as compared with other members, to carry specific loads, for example loads imparted by a rim or edge drive. For the purposes of this disclosure, for a first member to be reinforced as compared with a second member means that the first member is configured to safely carry a larger load than the second member. The reinforcement may be accomplished by making the first member of a larger size, for example a larger diameter, than the second member, by the first member having thicker walls than the second member, or by other design differences.

The frame 700 includes a first end 701 and a second end 702 and an axis of rotation 703. Fittings 704 and 705 at the ends 701 and 702 are displaced from the axis of rotation 703, and are configured to participate in the transfer of torque between a module built upon the frame 700 and adjacent modules. Examples of fittings suitable for use as the fittings 704 and 705 may be found in U.S. patent application Ser. No. 12/416,536, previously incorporated by reference. The frame 700 has an upper surface 706 defined by a set of upper nodes and a lower surface 707 defined by a set of lower nodes. Each node is connected by at least one strut to at least one node in the opposite surface. In the frame 700, the arrangement of the struts, upper diagonals, or both is asymmetrical about a central longitudinal plane 708. For example, the struts 709 and 710 are reinforced as compared with their counterparts 711 and 712 on the opposite side of the central longitudinal plane 708. In another example, diagonal member 713 in the upper surface of the frame 700 does not have a counterpart on the opposite side of the central longitudinal plane 708.

Figure 7C:
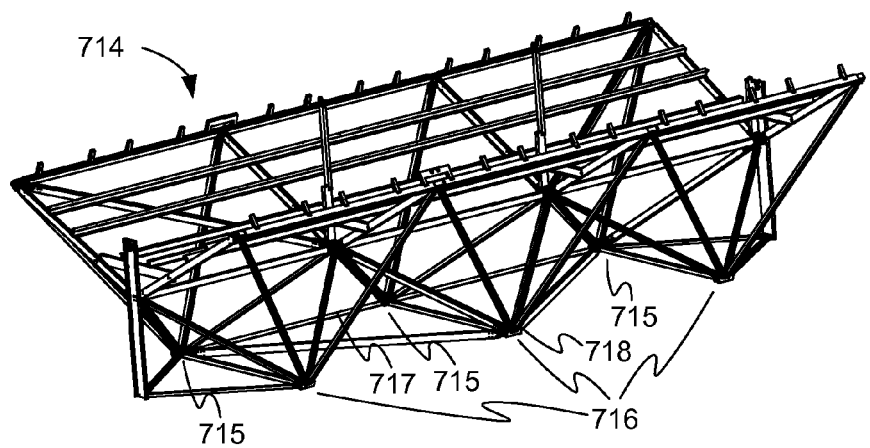

FIG. 7C shows another frame 714, including another example of frame asymmetry. In the frame 714, the lower surface is defined by nodes 715, arranged in one generally longitudinal row, and nodes 716, arranged in another generally longitudinal row. The nodes 715 are connected by one or more chord members 717. However the nodes 716 are not connected by chord members. Analysis has shown that the omission of chord members between the nodes 716 may not have a significant effect on the strength or stiffness the frame 714, especially when torque is transmitted between adjacent modules using an edge or rim drive arrangement.

Figure 7D:
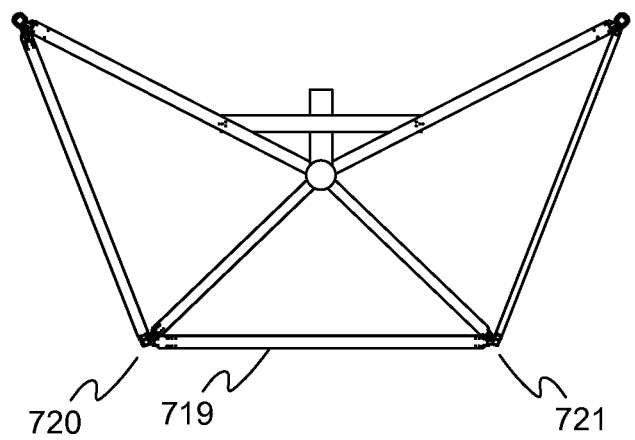

In another example type of frame asymmetry, three nodes in a particular generally longitudinal row are not collinear. For example, node 718 shown in FIG. 7C may be displaced inward and upward into the frame. The frame members associated with node 718 may be accordingly shortened, resulting in material savings. FIG. 7D illustrates an end view of a frame having a traditional layout wherein the nodes in a particular generally longitudinal row are collinear, and FIGS. 7E and 7F illustrate end views of asymmetric frames.

In FIG. 7D, lower surface 719 is defined by nodes in two generally longitudinal rows 720 and 721. In this traditional arrangement, the nodes in the rows 720 and 721 are collinear, so that in the orthogonal end view of FIG. 7D, the nodes appear superimposed. In FIG. 7E, a node 722 has been displaced inward and upward within the frame. Struts 723 and 724 and lower diagonal 725 may be accordingly shortened as compared with analogous members in the frame of FIG. 7D. The nodes in generally longitudinal row 726, including the node 722, are not collinear, due to the displacement of the node 722. In the example frame of FIG. 7E, the node 722 is connected to other nodes in its generally longitudinal row by at least one chord member 727.

Figure 7E:
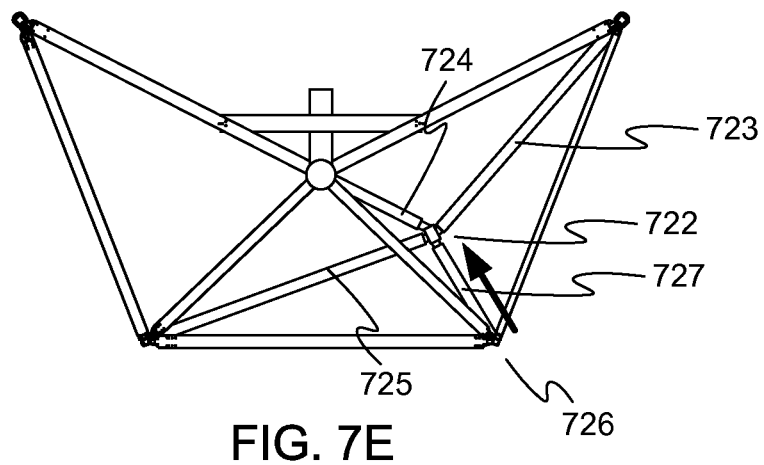
Figure 7F:
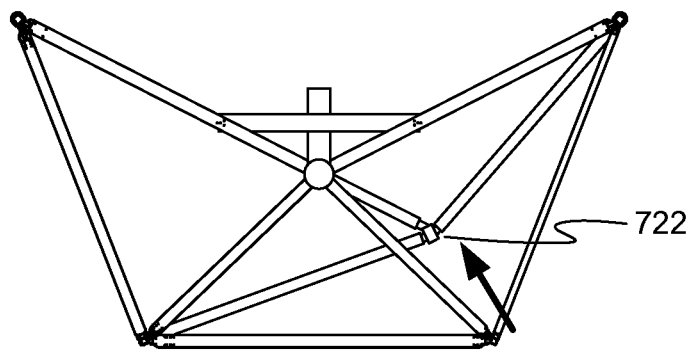

The example frame of FIG. 7E is similar that of FIG. 7D, except that no chord member connects the node 722 to the other nodes in its generally longitudinal row. This example illustrates that the various innovations described herein may be used in combination. FIG. 7F illustrates the use of a displaced node and an omitted framing member in combination.

Figure 7G:
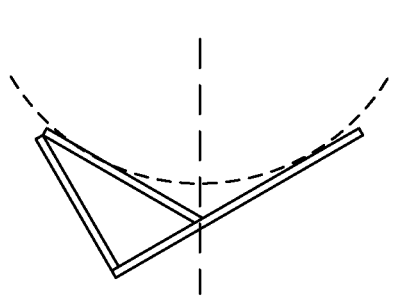
Figure 7H:
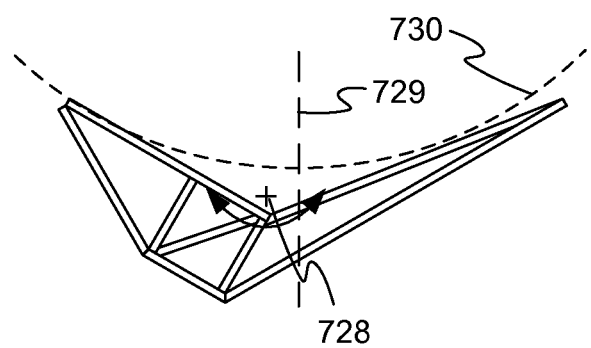

FIGS. 7G and 7H illustrate end views of collector modules exhibiting extreme frame asymmetry. The primary benefit of an asymmetric structure for a solar collector module frame is material efficiency. In the case of a frame which is designed to be driven by the rim, one side may have more support structure than the other. By leaving out unnecessary members on the non-drive side, or by changing the node configuration on the drive side, the overall structure can meet design requirements with less material. FIG. 7H also illustrates that an axis of rotation 728 of a frame need not be aligned with an axis of symmetry 729 of a reflector 730.

Discrete Frame Members

In some prior solar collector module frames, the chord members extend substantially the entire length of the frame. In accordance with another embodiment of the present invention, the chord members in a module frame do not run the entire length of the frame, but the chords are broken up into discrete units, each discrete unit joining only two nodes. Because the other kinds of framing members (diagonals, struts, and ribs) also extend only from one node to one other node, a frame in accordance with this embodiment has the property that no frame member reaches more than two nodes. This arrangement may have advantages in the fabrication of members to high precision. Transport and assembly of the frame components may also be simplified, as the members and subassemblies that need to be manipulated during assembly are smaller than in a frame having full-length chords. For the purposes of this disclosure, a frame member "reaches" a node when the frame member or a frame member assembly incorporating the frame member passes through or is connected to a hub at the node.

This embodiment may be especially useful in combination with hubs such as the hub 314 shown in FIG. 3F. Because the hub does not need to accommodate a chord member passing through it, the hub may be smaller, use less material, and require less elaborate tooling for its fabrication. Having the chord members broken up into discrete segments also facilitates the design and construction of asymmetric frames as illustrated in FIGS. 7E and 7F, because the nodes in any particular generally longitudinal row of nodes are not constrained by a single long chord to be collinear.

Figure 8A:
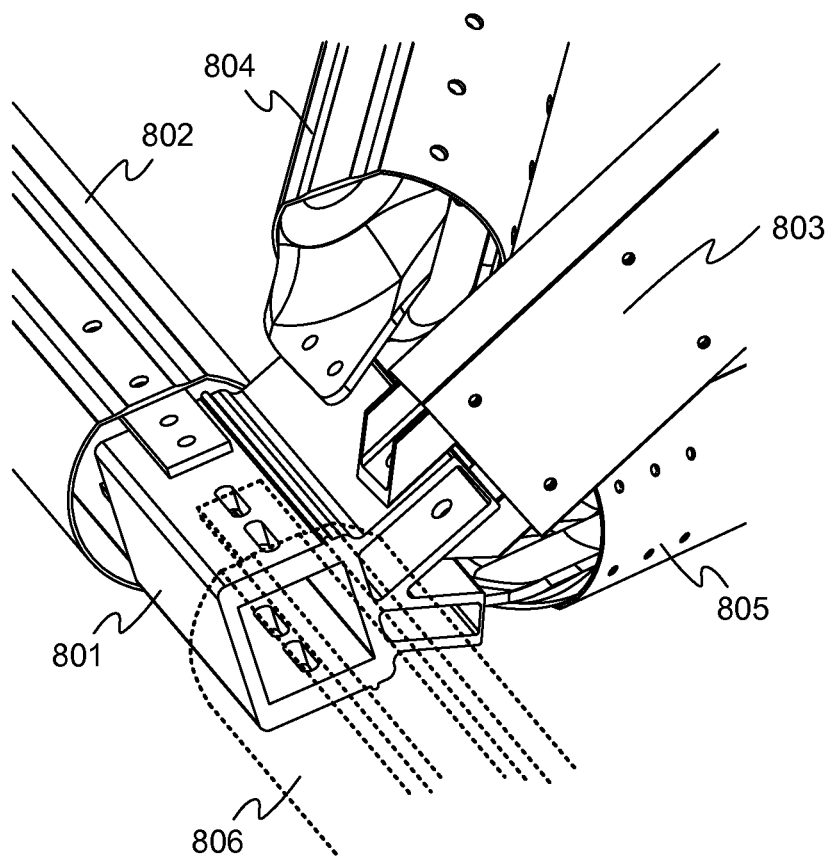
FIG. 8A shows a portion of a frame for a collector module, in accordance with other embodiments.

A module in accordance with this embodiment includes a curved reflector and a three-dimensional structural frame to which the reflector is mounted. The frame is made of a plurality of interconnected substantially-rigid frame members connected at nodes. The frame includes a set of upper nodes defining an upper surface of the frame, and a set of lower nodes defining a lower surface of the frame. A hub is present at each node. Each frame member reaching a particular node is connected to the respective hub at that particular node. No framing member, including the chord members, reaches more than two nodes. FIG. 8A illustrates one node connection in a module frame in accordance with this embodiment. In the node connection of FIG. 8A, a monolithic hub 801, made of a single piece of material, receives a chord member 802, a rib 803, a diagonal 804, and a strut 805. Each framing member terminates at the hub 801. A second chord member 806 may also be connected to the hub 801.

Figure 8B:
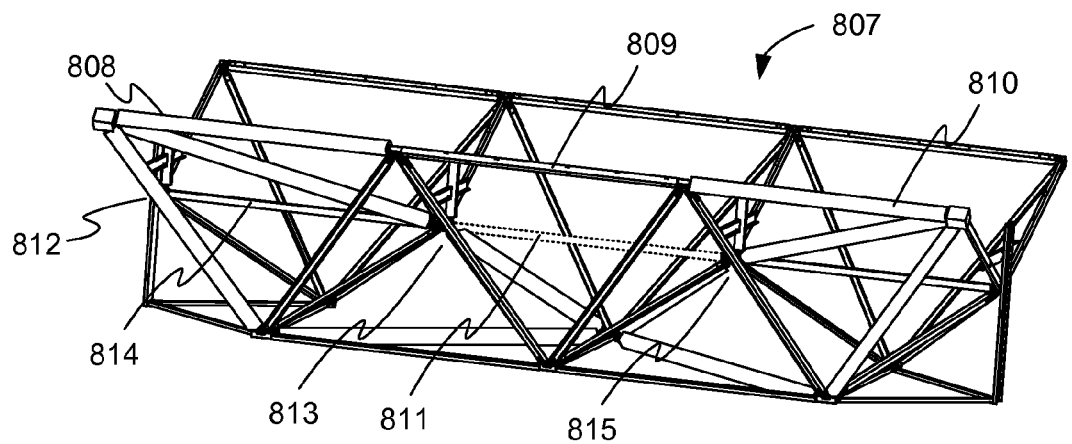
FIG. 8B shows an overall view of the frame of FIG. 8A.

This arrangement of discrete chord segments enables other design alternatives as well. For example, different chord members within a particular generally longitudinal row of nodes may be made of different sizes to accommodate different design load expectations. FIG. 8B shows an example solar collector module 807 in which three chord segments 808, 809, and 810, all connecting nodes within the same generally longitudinal row of nodes, are not all of the same cross sectional size. The three chord members may have different load requirements, such that the center chord member 809 need not withstand loads as high as those experienced by the members 808 and 810. In that case, the center chord member 809 may have a smaller cross section (for example a smaller diameter), so that material and cost are saved, as compared with making the chord member 809 as large as the members 808 and 810. Other frame geometries may result in different chord sections being larger or smaller.

In another example embodiment, one or more chord members may be omitted entirely. For example, chord member 811 (the center segment at the upper center of the frame), shown in FIG. 8B, may be omitted. In this embodiment, with the chord member 811 omitted, two nodes 812 and 813 in a particular row of nodes are connected by a chord member 814, but a different set of nodes 813 and 815 in the same row are not connected by a chord member. In other embodiments, none of the nodes in a row of nodes may be connected by chord members.

Full-Length Hubs

Figure 9A:
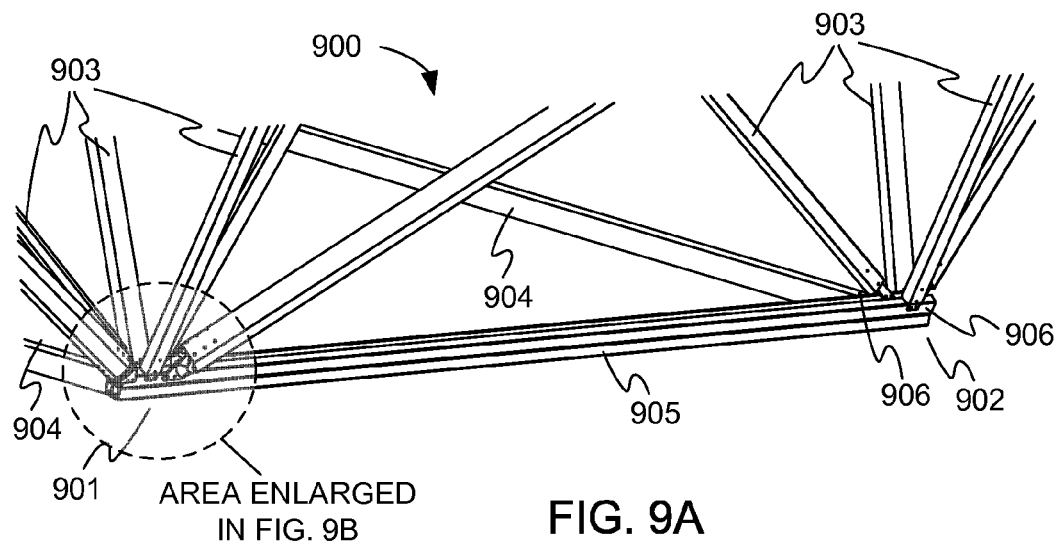
FIGS. 9A and 9B depict portions of a frame for a collector module, in accordance with other embodiments of the invention.

In accordance with another embodiment, the use of separate hubs may be avoided. FIG. 9A shows a portion of a three-dimensional structural frame 900, suitable for use as a frame for a solar collector module, in accordance with this embodiment. The frame 900 includes a set of upper nodes defining an upper surface (not shown). The upper nodes are preferably arranged in generally longitudinal rows. The frame 900 also includes a set of lower nodes defining a lower surface, also arranged in generally longitudinal rows. In FIG. 9, two nodes 901 and 902 are shown. Various structural members, including struts 903 and ribs 904, may connect at the nodes. Each node in the upper surface is connected to at least one node in the lower surface by at least one of the struts 903.

Figure 9B:
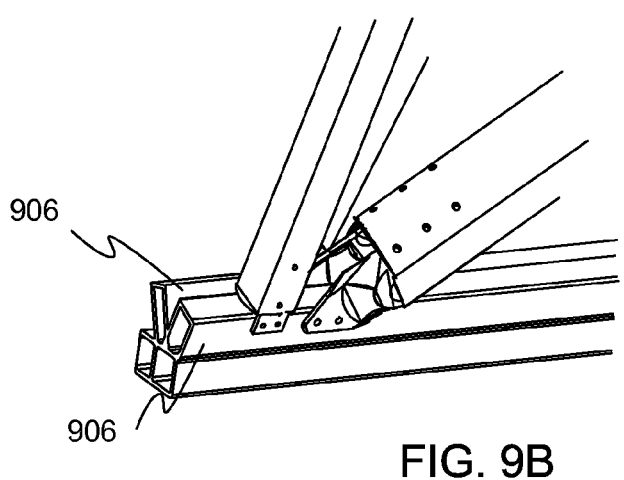

A substantially rigid elongate chord member 905 extends to at least two nodes in a particular row of nodes, including the nodes 901 and 902. Similar chord members may be provided at other rows of nodes in the frame 900. The chord member 905 has a substantially constant cross sectional shape throughout its length, and may conveniently be made of extruded aluminum, although other materials and fabrication processes may be used. The chord member 905 includes connection features for connecting the various other framing members. In the embodiment of FIG. 9, the connection features are protruding tabs 906. The tabs 906 may be, for example, unitary fins, parallel fins, or may be tabs as illustrated in FIG. 9. A tab may preferably have two spaced apart outer sides and a spanning surface joining the outer sides. A tab may preferably have an aspect ratio between 0.25 and 4.0, and more preferably between 0.33 and 3.0, and even more preferably between 0.5 and 2.0. FIG. 9B shows a portion of the frame of FIG. 9A in more detail, with several frame members removed for purposes of illustration. Details of the tab construction are described above in conjunction with FIGS. 3A-3G.

While the embodiment of FIG. 9 may result in somewhat higher material usage than using hubs connected by chord members, the embodiment of FIG. 9 uses fewer parts, and may facilitate assembly of the frame 900. The chord member 905 may be manufactured in the same way as extruded hubs such as the hub 309 shown in FIG. 3C. For example, an extrusion having the cross section of the chord member 905 may be cut into short lengths to form hubs, and into longer lengths to form chord members such as the chord member 905.

Attached Channel Hub

Figure 10:
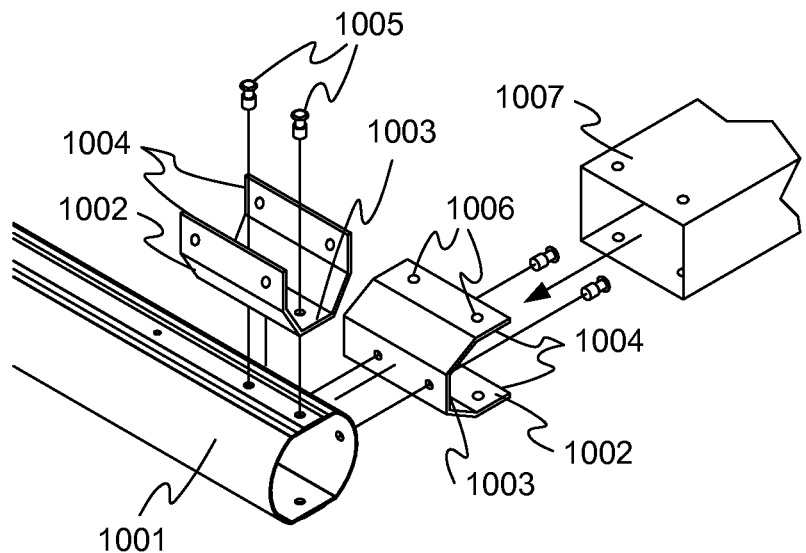
FIG. 10 shows a means of connecting members in a solar collector module frame, in accordance with other embodiments of the invention.

FIG. 10 illustrates another kind of connection at a node of a frame, in accordance with another embodiment. In FIG. 10, a chord member 1001 runs longitudinally within a frame similar to those described above, extending to some or all of the nodes within one generally longitudinal row of nodes in one surface of the frame. The chord member 1001 may have a constant cross sectional shape along its length, and is conveniently made by extrusion of aluminum, although other materials and processes may be used. The chord member 1001 is shown as generally round with integrated flattened surfaces, but could be square, rectangular, of another polygonal shape, oval, elliptical, or of any other suitable shape. The chord member 1001 is preferably hollow, as shown. A plurality of struts may connect the nodes, such that each node in the upper surface is connected to at least one node in the lower surface by at least one of the struts.

Affixed to an outside surface of the chord member 1001 are one or more channels 1002. Each of the channels 1002 has a throat 1003 and two spaced apart sides 1004. Each of the channels 1002 is affixed at its throat 1003 to the chord member 1001, and is configured to receive at least one strut member such as member 1007, for example between the sides 1004. The channels 1002 may be affixed to the chord member 1001 by any suitable means, for example by rivets, bolts, screws, adhesive bonding, welding, or an integral attachment feature such as a dovetail joint. Multiple means may be used for affixing the channels 1002 to the chord member 1001. In the example of FIG. 10, the channels 1002 are poised to be affixed using rivets 1005. The channels 1002 may also be conveniently made by extrusion, and may be shaped to conform to the outside surface of the chord member 1001. Each of the channels 1002 is preferably aligned toward other nodes to which members connecting to the respective channel 1002 also connect. The channels 1002 can extend along the chord member 1001 a distance sufficient to receive as many frame members as connect at the node.

The node connection of FIG. 10 may be advantageous in that frame members can be received between the spaced-apart sides 1004 of the channels 1002, without the need for frame member end connectors. For example, each channel may comprise one or more holes 1006 cooperatively positioned with holes in the end of a member being received, so that the frame member and the channel can be connected by one or more pins, bolts, screws, or other fasteners.

Mirror Standoffs

Figure 11A:
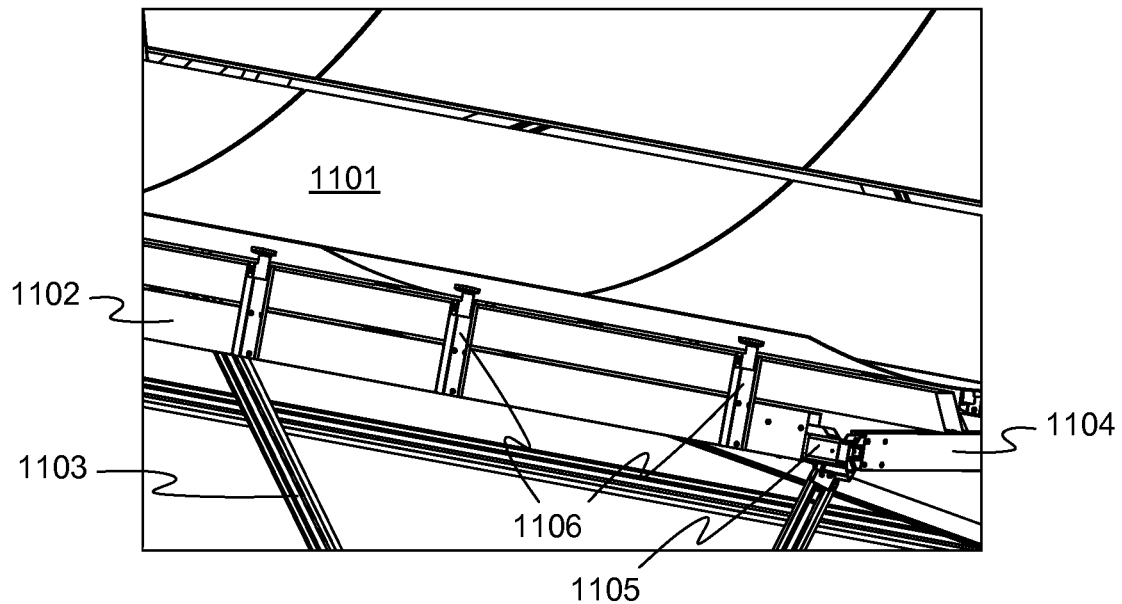
FIGS. 11A and 11B show portions of solar collector modules, in accordance with other embodiments of the invention.

FIG. 11A shows a portion of a solar collector module in accordance with other embodiments. A space frame made with straight members may have an upper surface whose members (chords, ribs, and diagonals) define substantially flat planes. The entire surface need not be flat, and may be V-shaped to approximate the curved shape of a reflector to be held in place by the frame. However, transition elements may still be required to accommodate the remaining shape differences and to support the reflector in its proper position. In some prior designs, purlins were placed on the upper surface of the frame, running the length of the upper surface. The purlins were selected to have a height that would space the reflector, resting on the purlins, properly from the frame elements. Full length purlins require substantial material, and may add weight and cost to a solar collector module.

In the embodiment of FIG. 11, a solar collector module comprises a curved reflector 1101 and a three-dimensional supporting structural frame to which the reflector is attached. For example, the frame includes rim chord member 1102, struts 1103, and ribs 1104, interconnected by hubs 1105. Discrete standoffs 1106 are placed at spaced locations along at least the rim chord member 1102. The standoffs 1106 are sized to support the reflector 1101 at the proper distance from the chords so that the reflector 1101 performs properly to concentrate incoming solar radiation onto a receiving tube (not shown in FIG. 11). When the chord member 1102 is parallel to the axis of the reflector 1101 and the supporting frame, then the standoffs placed along the chord member 1102 may be all of the same size. Standoffs of other sizes may be used at other chord members.

The standoffs 1106 are preferably made of aluminum formed principally by extrusion, although other materials and processes may be used. The standoffs 1106 may be affixed to the chord members such as the chord member 1102 by any suitable means, including rivets, bolts, screws, or welding. The reflector 1101 may be made, for example, of one or more segments of aluminized glass, polished metal, or another suitably reflective material. The reflector 1101 may be attached to the standoffs 1106 by any suitable means, including bolts, screws, adhesives, or another attachment means.

Figure 11B:
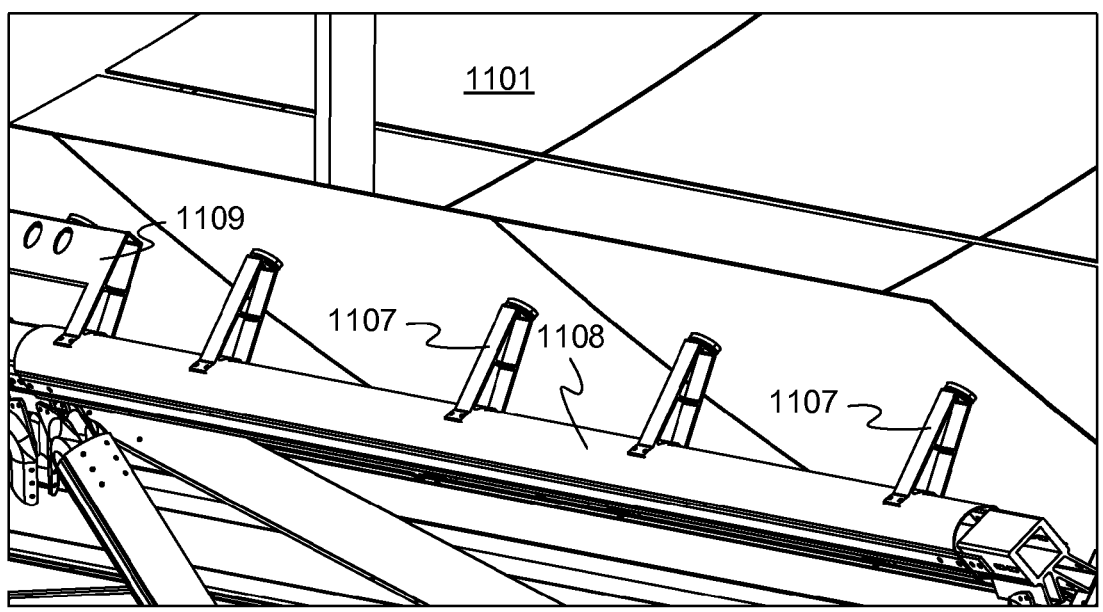

FIG. 11B shows a portion of a solar collector module in accordance with other embodiments, and illustrates standoffs 1107 of an alternative design. The standoffs 1107 are also preferably made by extrusion and cut to length, and are shaped to engage with chord member 1108. As is illustrated by standoff 1109, not all of the standoffs need be of the same length, and additional machining operations may be performed on the standoffs such as the standoff 1109, for example to span nodes. The standoffs 1107 and 1109 may be affixed to the chord member 1108 and attached to the reflector 1101 in ways similar to those discussed above.

The present invention has been described above in terms of presently preferred embodiments so that an understanding of the present invention can be conveyed. There are, however, many configurations for collector systems not specifically described herein but with which the present invention is applicable. The present invention should therefore not be seen as limited to the particular embodiments described herein, but rather, it should be understood that the present invention has wide applicability with respect to collector systems generally. All modifications, variations, or equivalent arrangements and implementations that are within the scope of the attached claims should therefore be considered within the scope of the invention.

What is claimed is:

1. A solar collector module, comprising:
    a reflector configured to direct incoming solar radiation onto a receiver; and a three-dimensional structural frame to which the reflector is mounted, the three-dimensional structural frame comprising a plurality of interconnected substantially rigid elongate frame members, the three-dimensional structural frame having two ends and further comprising at each end a fitting displaced from an axis of rotation of the solar collector module, each fitting configured to participate in the transfer of torque between the solar collector module and an adjacent module via a direct connection between the solar collector module and the adjacent module at a location displaced from the axis of rotation;
    wherein the three-dimensional structural frame is asymmetrical about a central longitudinal plane.

2. The solar collector module of claim 1, wherein certain frame members are reinforced as compared with other frame members in order to carry specific loads imparted by the direct connection.

3. The solar collector module of claim 1, wherein at least one frame member on a first side of the central longitudinal plane is of a different size than a counterpart of the frame member on a second side of the central longitudinal plane.

4. The solar collector module of claim 1, wherein at least one frame member of a first side of the central longitudinal plane does not have a counterpart on a second side of the central longitudinal plane.

5. The solar collector module of claim 1, wherein the frame members are connected at nodes, and wherein the three-dimensional structural frame comprises an upper surface defined by a set of upper nodes and a lower surface defined by a set of lower nodes, each lower node connected to at least one upper node by a strut, wherein at least one lower node on a first side of the central longitudinal plane is connected to another lower node on the first side of the central longitudinal plane by a chord member running generally parallel to the axis of rotation, and wherein at least one lower node on a second side of the central longitudinal plane is not connected to a chord member.

6. The solar collector of claim 1, wherein the frame members are connected at nodes, and wherein the three-dimensional structural frame comprises an upper surface defined by a set of upper nodes and a lower surface defined by a set of lower nodes, and wherein there are at least three lower nodes in a generally longitudinal row on one side of the central longitudinal plane, and wherein the three lower nodes are not collinear.

7. The solar collector of claim 1, wherein the reflector is curved.

8. A solar collector module, comprising:
    a reflector configured to direct incoming solar radiation onto a receiver;
    a three-dimensional structural frame to which the reflector is mounted, the three-dimensional structural frame comprising a plurality of interconnected substantially rigid elongate frame members, wherein the frame members are connected at nodes, and wherein the three-dimensional structural frame comprises an upper surface defined by a set of upper nodes and a lower surface defined by a set of lower nodes, each lower node connected to at least one upper node by a strut; and
    a monolithic hub at each node to which each frame member reaching the respective node is connected;
    wherein no frame member reaches more than two nodes, and wherein the nodes are arranged in generally longitudinal rows, and the nodes in at least one row of lower nodes are not collinear.

9. The solar collector module of claim 8, wherein a set of two nodes in one row are connected by a chord member of a first cross sectional size, and a different set of two nodes in the same row are connected by a chord member of a second cross sectional size different from the first.

10. The solar collector module of claim 8, wherein a set of two nodes in one row are connected by a chord member, and a different set of two nodes in the same row are not connected by any chord member.

11. A solar collector module, comprising:
    a reflector configured to direct incoming solar radiation onto a receiver;
    a three-dimensional structural frame to which the reflector is mounted, the three-dimensional structural frame comprising a plurality of interconnected substantially rigid elongate frame members, wherein the frame members are connected at nodes, and wherein the three-dimensional structural frame comprises an upper surface defined by a set of upper nodes and a lower surface defined by a set of lower nodes, each lower node connected to at least one upper node by a strut; and
    a monolithic hub at each node to which each frame member reaching the respective node is connected;
    wherein no frame member reaches more than two nodes;
    and wherein the nodes are arranged in generally longitudinal rows;
    and wherein, within at least one particular row, no two nodes are connected by chord members.

12. The solar collector module of claim 11, wherein the reflector is curved.

13. The solar collector module of claim 11, further comprising at least one substantially rigid elongate chord member in each row of the upper surface, connecting at least two nodes in the respective row; and
    a plurality of discrete standoffs directly affixed to the chord members in the upper surface, the standoffs at least partially supporting the reflector.

14. A solar collector module, comprising:
    a reflector configured to direct incoming solar radiation onto a receiver; a three-dimensional structural frame to which the reflector is mounted, the three-dimensional structural frame comprising a plurality of interconnected substantially rigid elongate frame members, wherein the frame members are connected at nodes, and wherein the three-dimensional structural frame comprises an upper surface defined by a set of upper nodes and a lower surface defined by a set of lower nodes, each lower node connected to at least one upper node by a strut, and wherein the nodes are arranged in generally longitudinal rows;
    at least one substantially rigid elongate chord member in each row of the upper surface, connecting at least two nodes in the respective row; and
    a plurality of discrete standoffs directly affixed to the chord members in the upper surface, the standoffs at least partially supporting the reflector; and wherein the nodes in at least one row of lower nodes are not collinear.

15. The solar collector module of claim 14, wherein each standoff is configured to be made by a process comprising extrusion.

16. The solar collector module of claim 14, wherein the standoffs are affixed to the respective chord members by means selected from the group consisting of bolts, screws, and welding.

17. The solar collector module of claim 14, wherein the reflector is curved.

* * * * *